United States Patent
Kojima

(10) Patent No.: US 9,621,535 B2
(45) Date of Patent: Apr. 11, 2017

(54) ELECTRONIC KEY SYSTEM AND INFORMATION REGISTRATION SYSTEM

(71) Applicant: DENSO CORPORATION, Kariya, Aichi-pref. (JP)

(72) Inventor: Masahito Kojima, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 24 days.

(21) Appl. No.: 14/778,112

(22) PCT Filed: Mar. 12, 2014

(86) PCT No.: PCT/JP2014/001391
§ 371 (c)(1),
(2) Date: Sep. 18, 2015

(87) PCT Pub. No.: WO2014/148005
PCT Pub. Date: Sep. 25, 2014

(65) Prior Publication Data
US 2016/0149884 A1  May 26, 2016

(30) Foreign Application Priority Data

Mar. 21, 2013 (JP) ................................. 2013-058298

(51) Int. Cl.
*H04L 29/06* (2006.01)
*G07C 9/00* (2006.01)
(Continued)

(52) U.S. Cl.
CPC .......... *H04L 63/08* (2013.01); *G07C 9/00007* (2013.01); *G07C 9/00309* (2013.01);
(Continued)

(58) Field of Classification Search
CPC ..... H04L 63/08; H04L 67/12; G07C 9/00007; G07C 9/00309; G07C 9/00817;
(Continued)

(56) References Cited

U.S. PATENT DOCUMENTS

| 5,886,421 A * | 3/1999 | Mizuno ................... B60R 25/00 180/287 |
| 2009/0267733 A1* | 10/2009 | Teramura ................ B60R 25/24 340/5.61 |

FOREIGN PATENT DOCUMENTS

| JP | H11245770 A | 9/1999 |
| JP | 3667760 B2 | 7/2005 |

OTHER PUBLICATIONS

International Search Report and Written Opinion (in Japanese with English Translation) for PCT/JP2014/001391, mailed Jun. 10, 2014; ISA/JP.

* cited by examiner

*Primary Examiner* — Edwin Holloway, III
(74) *Attorney, Agent, or Firm* — Harness, Dickey & Pierce, P.L.C.

(57) ABSTRACT

An electronic key system includes a mobile device and a control device. Main identification information identifying the control device is registered in the control device as registrant identification information. When the mobile device receives a response request including the registrant identification information and response timing, the mobile device compares the registrant identification information and the response timing which included in the response request with registrant identification information and response timing registered in the mobile device. When a result of the comparing is a match, the mobile device transmits the mobile device code to the control device. The control device includes a registration unit that newly gen- (Continued)

erates the main identification information with different content each time a registration command is inputted, and registers the newly generated main identification information in a storage device of the control device as registrant identification information.

12 Claims, 22 Drawing Sheets

(51) Int. Cl.
*H04L 29/08* (2006.01)
*H04W 12/06* (2009.01)

(52) U.S. Cl.
CPC .............. *H04L 67/12* (2013.01); *H04W 12/06* (2013.01); *G07C 9/00817* (2013.01); *G07C 2009/00769* (2013.01); *G07C 2009/00793* (2013.01)

(58) Field of Classification Search
CPC ........... G07C 2009/00769; G07C 2009/00793; H04W 12/06
USPC ........................................................ 340/5.61
See application file for complete search history.

ELECTRONIC KEY SYSTEM AND INFORMATION REGISTRATION SYSTEM

CROSS REFERENCE TO RELATED APPLICATIONS

This application is a U.S. National Phase Application under 35 U.S.C. 371 of International Application No. PCT/JP2014/001391 filed on Mar. 12, 2014 and published in Japanese as WO 2014/148005 A1 on Sep. 25, 2014. This application is based on and claims the benefit of priority from Japanese Patent Application No. 2013-058298 filed on Mar. 21, 2013. The entire disclosures of all of the above applications are incorporated herein by reference.

TECHNICAL FIELD

The present disclosure relates to an electronic key system which executes authentication processing based on a result of wireless information communication and relates to an information registration system which registers information required for the authentication processing.

BACKGROUND ART

There is known an electronic key system which includes at least one mobile device and an in-vehicle device mounted in a vehicle and which executes authentication processing based on a result of wireless information communication executed between the mobile device and the in-vehicle device (see patent literature 1).

In an electronic key system of the above type, a response request requesting mobile device identification information is transmitted from an in-vehicle device to a mobile device together with vehicle identification information. Such mobile device identification information is fixed-value identification information pre-allocated to each mobile device. The vehicle identification information also contains a fixed value pre-allocated to each vehicle to identify the vehicle.

When the mobile device receives the response request, the mobile device responds by transmitting the mobile device identification information allocated to the mobile device itself at a response timing. The response timing is registered in the mobile device. When the in-vehicle device receives the response, the in-vehicle device compares, for authentication, the received mobile device identification information with the mobile device identification information registered in the in-vehicle device. When the authentication is successful, the in-vehicle device unlocks/locks doors and/or starts up the internal combustion engine of the vehicle.

In such an electronic key system, the mobile device and the in-vehicle device execute information registration processing to register information required for the authentication processing in the mobile device and the in-vehicle device. Every time when the information registration processing is executed, the mobile device identification information on the mobile device is registered in the in-vehicle device, and the vehicle identification information and the response timing for the mobile device are registered in the mobile device.

Normally, when a user of the electronic key system executes information processing once, the user registers the vehicle identification information and the response timing in every desired mobile device in order to enable the electronic key system to function. The response timings registered in the desired mobile devices each time the information registration processing is executed are determined as unique ones on a mobile device by mobile device basis.

The inventor of the present application has found the following regarding electronic key systems.

In an electronic key system, there are cases where it becomes necessary to make a new mobile device function as an electronic key. In such cases, for the new mobile device with neither vehicle identification information nor registered response timing, it is necessary to newly register the vehicle identification information and response timing in the new mobile device.

In an existing type of electronic key system, it is possible by executing information registration processing to register the vehicle identification information and response timing in each mobile device and to register mobile device identification information in an in-vehicle device. However, in the information registration processing executed in an existing type of electronic key system, nothing is done about the mobile device identification information already registered in the in-vehicle device or the vehicle identification information and the response timing already registered in the mobile devices.

For example, assume that a mobile device (hereinafter referred to as an "existing registered mobile device") in which vehicle identification information and response timing are already registered is present and that the vehicle identification information and response timing have been newly registered in another mobile device (hereinafter referred to as a "newly registered mobile device") which previously had no vehicle identification information and no response timing registered in it. In this case, the existing registered mobile device and the newly registered mobile device have the same vehicle identification information and response timing registered in them.

In the above case of an existing type of electronic key system, when a response request requesting mobile device identification information is transmitted from the in-vehicle device together with vehicle identification information, an interference possibly occurs in such a way that both the existing registered mobile device and the newly registered mobile device transmit their mobile device identification information (MOBILE DEVICE CODE "a" and MOBILE DEVICE CODE "b" in FIG. 19) at the same response timing as shown in FIG. 19. When such interference occurs in an existing type of electronic key system, the authentication processing cannot be properly executed.

Namely, in an existing type of electronic key system, the same information may be registered in a plurality of mobile devices.

PRIOR ART LITERATURES

Patent Literature

[Patent Literature 1]
Japanese Patent No. 3667760

SUMMARY OF INVENTION

It is an object of the present disclosure to reduce an occurrence of registration of identical information in a plurality of mobile devices in an electronic key system.

An electronic key system according to an example of the present disclosure includes at least one mobile device that is carried by a user and a control device that executes authentication processing based on a result of executing information communication with the mobile device. The electronic key system is configured as follows. Main identification information identifying the control device is registered in the control device as registrant identification information. When the mobile device receives a response request including registrant identification information and response timing, the mobile device compares the registrant identification information and the response timing which are included in the response request with registrant identification information and response timing which are registered in the mobile device. The main identification information identifies the control device and is registered in the control device. The response timing represents a timing specific to the mobile device at which the mobile device is to transmit, in response to the response request, a mobile device code serving as identification information to identify the mobile device. When a result of the comparison is a match, the mobile device transmits the mobile device code allocated to the mobile device to the control device. The control device transmits the response request to the mobile device and executes the authentication processing by comparing a mobile device codes registered in the control device with the mobile device code received from the mobile device as the identification information. In this electronic key system, the control device includes a registration unit to execute registration control. In the registration control, the registration unit generates the main identification information with different content each time a registration command is inputted from outside, and registers the generated main identification information in a storage device of the control device in association with the mobile device code of the mobile device for use as the registrant identification information.

In the electronic key system described above, each time registration control is executed, new main identification information can be generated and registered in a storage device included in the control device. Therefore, the registrant identification information registered in the storage device is updated to be different from the registrant identification information before being updated.

Assume that, when registering information in a mobile device with no registrant identification information and no response timing registered therein (hereinafter referred to as a "newly registered mobile device") so as to make the mobile device function as an electronic key, main identification information newly generated in the electronic key system is registered in the newly registered mobile device as the registrant identification information. In this case, the registrant identification information registered in the newly registered mobile device differs from the registrant identification information registered in another mobile device (hereinafter referred to as an "existing registered mobile device") having the registrant identification information and response timing already registered therein.

Thus, the electronic key system described above can prevent registration of identical information in a plurality of mobile devices.

Furthermore, in the above electronic key system, an existing registered mobile device and a newly registered mobile device are prevented from transmitting their mobile device codes at a same response timing in the authentication processing. Therefore, the above electronic key system can reduce interference during the authentication processing, so that authentication processing failures can be reduced.

An information registration system according to another example of the present disclosure is provided with at least one mobile device carried by a user and a control device that executes authentication processing based on a result of executing information communication with the mobile device. The information registration system is configured as follows. Main identification information identifying the control device is registered in the control device as registrant identification information. When the mobile device receives a response request including registrant identification information and response timing, the mobile device compares the registrant identification information and the response timing included in the response request with the registrant identification information and response timing registered in the mobile device. The main identification information identifies the control device and is registered in the control device. The response timing represents a timing specific to the mobile device at which the mobile device is to transmit, in response to the response request, a mobile device code as identification information to identify the mobile device. When the result of the comparison is a match, the mobile device transmits the mobile device code allocated to the mobile device to the control device. The control device transmits the response request to the mobile device and executes the authentication processing by comparing the mobile device codes registered in the control device with the mobile device code received from the mobile device as the identification information. Each time a registration command is inputted from outside to this electronic key system, information required to execute authentication processing is registered in the electronic key system. The information registration system includes a registration unit which, each time the registration command is inputted, generates the main identification information with different content and registers the newly generated main identification information in a storage device of the control device for use as the registrant identification information.

The information registration system as described above can provide technical effects similar to those provided by the foregoing electronic key system.

EMBODIMENTS FOR CARRYING OUT INVENTION

Embodiments of the present disclosure will be described below with reference to drawings.

First Embodiment

Figure 1:
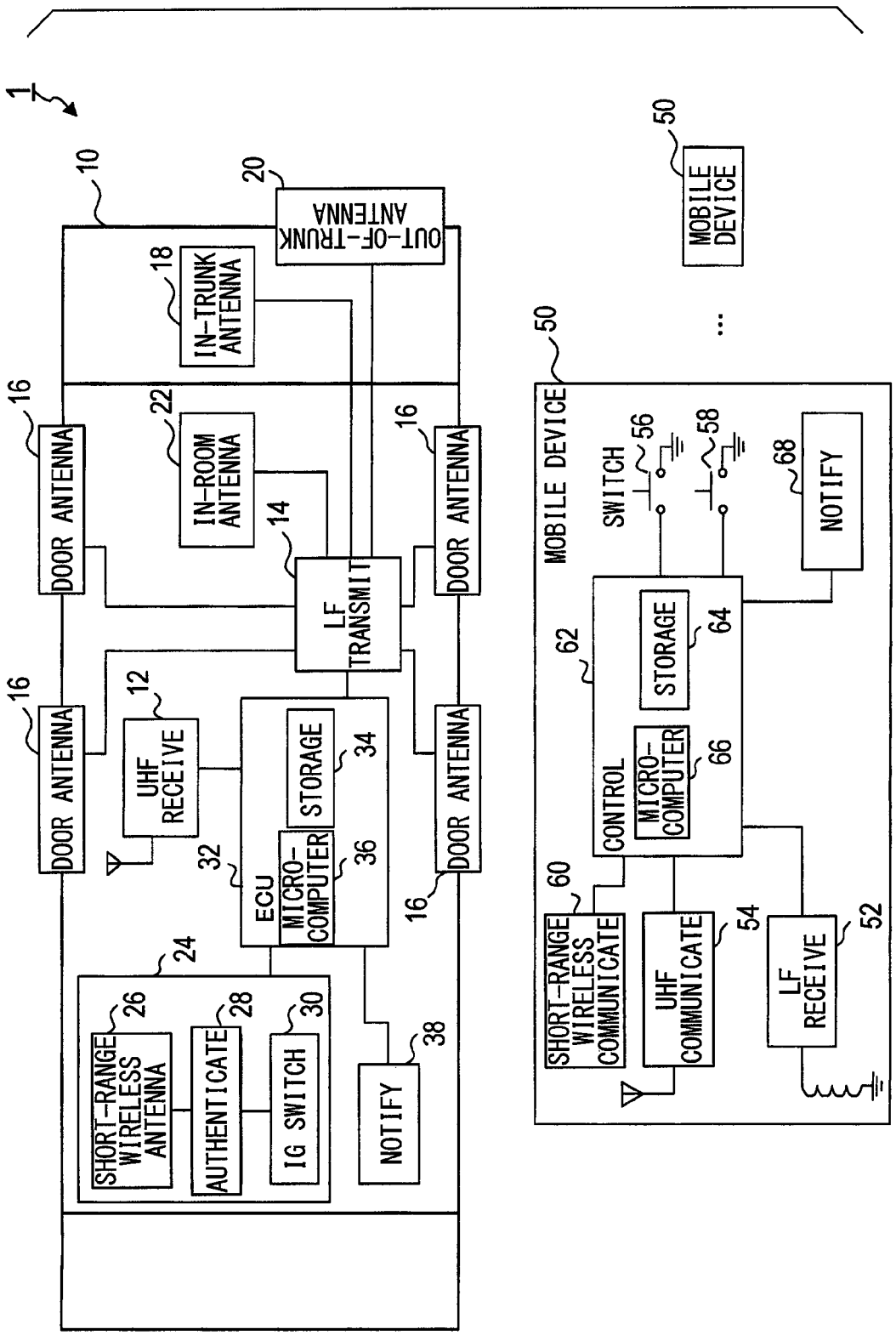
FIG. 1 is a block diagram schematically showing a configuration of an electronic key system.

An electronic key system 1 shown in FIG. 1 includes an in-vehicle device 10 mounted in a vehicle, and mobile devices 50, - - - , 50 carried by vehicle users. When authentication processing executed based on information communication between a mobile device 50 and the in-vehicle device 10 is completed, the electronic key system 1 realizes various functions. Note that a plurality of mobile devices 50 are included in the electronic key system 1.

The functions realized by the electronic key system 1 include a function to execute door unlock control to unlock vehicle doors (a so-called smart entry function) and a function to execute door lock/unlock control in accordance with button operations at mobile devices 50 (a so-called remote keyless entry function). Furthermore, a function to permit starting an internal combustion engine mounted on the vehicle is also included in the functions realized by the electronic key system 1.

Namely, when a mobile device 50 carried by a vehicle user is present in a wireless communication range around the vehicle and the authentication processing executed based on information communication between the particular mobile device 50 and the in-vehicle device 10 is successfully completed, the electronic key system 1 permits door unlocking/locking and starting up of an internal combustion engine.

<In-Vehicle Device>

The in-vehicle device 10 includes a UHF reception unit 12, an LF transmission unit 14, door antennas 16, an in-trunk antenna 18, an out-of-trunk antenna 20, an interior antenna 22, an engine starting mechanism 24, an electronic control unit (ECU) 32, and an notifier device 38.

The LF transmission unit 14 transmits wireless signals to the mobile devices 50. The wireless signals transmitted from the LF transmission unit 14 via door antennas 16 (four antennas in the present embodiment), in-trunk antenna 18, out-of-trunk antenna 20, and interior antenna 22 reach the respective limited communication ranges. The UHF reception unit 12 receives wireless signals transmitted from the mobile devices 50.

The engine starting mechanism 24 starts up an internal combustion engine mounted on the vehicle. The engine starting mechanism 24 includes a short-range wireless antenna 26, an authentication device 28, and an ignition (IG) switch 30. The short-range wireless antenna 26 executes short-range wireless communication with the mobile devices 50. The short-range wireless antenna 26 includes a coil which is electromagnetically coupled with a short-range wireless communication unit 60, being described later, of each mobile device 50. The authentication device 28 transmits and receives information to and from the mobile devices 50 electromagnetically coupled with the authentication device 28 via the short-range wireless antenna 26. Furthermore, when it is detected that a vehicle user has operated an IG switch 30 to start the engine of the vehicle, the authentication device 28 included in the engine starting mechanism 24 determines whether the internal combustion engine is in a state ready to be started. When the engine is determined to be ready to be started, the authentication device 28 transmits an engine start signal to the engine control system.

The electronic control unit 32 includes a storage device 34 and a microcomputer 36. The storage device 34 is a rewritable nonvolatile storage device. The microcomputer 36 is a microcomputer with, at least, a ROM, a RAM, and a CPU, which is well-known.

The notifier device 38 outputs information in accordance with signals received from the electronic control unit 32. The notifier device 38 may include, for example, a display device and a sound output device.

<Mobile Device>

Each mobile device 50 includes an LF reception unit 52, a UHF communication unit 54, push switches 56 and 58, the short-range wireless communication unit 60, a control circuit 62, and an notifier mechanism 68.

The LF reception unit 52 receives wireless signals from the in-vehicle device 10. The UHF communication unit 54 transmits wireless signals to the in-vehicle device 10.

The push switches 56 and 58 are provided for use as keys to serve as triggers to use mainly the remote keyless entry function. When the push switch 56 is turned on, the doors of the vehicle are locked. When the push switch 58 is turned on, the doors of the vehicle are unlocked.

The short-range communication unit 60 executes short-range wireless communication with the in-vehicle device 10. The short-range communication unit 60 includes, for example, a coil and a transmit/receive circuit, and transmits/receives information to/from the short-range wireless antenna 26 of the in-vehicle device 10 electromagnetically coupled with of the in-vehicle device 10.

The control circuit 62 includes a storage device 64 and a microcomputer 66. The storage device 64 is a rewritable nonvolatile storage device. The microcomputer 66 is a microcomputer with at least, a ROM, a RAM, and a CPU, which is well-known.

The notifier mechanism 68 notifies whether the locking/unlocking of the doors effected using the push switches 56 and 58 is done successfully. The notifier mechanism 68 includes, for example, an indicator which lights when the doors are successfully locked/unlocked and a buzzer which sounds when the doors are successfully locked/unlocked.

<Outline of Operation of Electronic Key System>

The authentication processing executed in the electronic key system 1 having the above configuration will be described in the following. Note that the authentication processing is repeatedly executed at a predetermined period.

In the authentication processing, first the in-vehicle device 10 transmits, via the LF transmission unit 14, a response request including vehicle identification information (hereinafter referred to as a "vehicle code") about the vehicle mounted with the in-vehicle device 10 and information on response timing.

The vehicle code is main identification information to identify the vehicle mounted with the in-vehicle device 10. The response timing is information representing timing at which a mobile device 50 is to transmit a response containing its mobile device code. Specific response timing is specified for each mobile device 50. The mobile device code is identification information to identify a mobile device 50. Each mobile device 50 is allocated with a specific mobile device code beforehand.

In the authentication processing, each mobile device 50 which is present in the communication range of antenna 16, 18, 20, or 22 and which has received a response request from the LF transmission unit 14 compares the vehicle code and response timing registered in itself with the vehicle code and response timing specified in the response request received from the in-vehicle device 10. When the result of the comparison is a match, the mobile device 50 responds to the response request by transmitting the mobile device code allocated to the mobile device 50 via the UHF communication unit 54 at the response timing registered in the mobile device 50.

When the UHF reception unit 12 receives a mobile device code from a mobile device 50, the ECU 32 of the in-vehicle device 10 compares the received mobile device code with the mobile device codes registered in the in-vehicle device 10. When, as a result of the comparison, the authentication is successfully made, the control to realize various functions is executed.

Subsequently, the electronic key system 1 executes control, which may be typical for this type of electronic key system 1. For example, when, in the above door unlock permitted state, a signal is received from a touch sensor (not shown) provided for the outer door knob of the driver side door and indicates that the door knob has been touched by a person, the electronic control device 32 transmits an unlock signal to the door control system. As a result, a door lock motor (not shown) is driven and all doors of the vehicle are unlocked. Various other control operations including, for example, permitting starting of the engine are also performed. However, such control operations are not directly relevant to the essential portion of the present disclosure, so that they will not be further described herein.

To execute the above authentication processing in the electronic key system 1 of the present embodiment, information required for the authentication processing needs to be registered in the mobile devices 50 and the in-vehicle device 10.

Processing (hereinafter referred to as "information registration processing") executed in the electronic key system 1 as registration control for registering the information required for the authentication processing includes in-vehicle registration processing executed by the electronic control unit 32 of the in-vehicle device 10 and mobile device registration processing executed by the control circuit 62 of each mobile device 50.

<In-Vehicle Registration Processing>

In the in-vehicle registration processing, information communication is executed between the in-vehicle device 10 and each mobile device 50 present in the communication range of the short-range wireless antenna 26 of the in-vehicle device 10, and the information required for the authentication processing is stored in the in-vehicle device 10.

The in-vehicle registration processing is executed by the electronic control unit 32 of the in-vehicle device 10. The processing is started when a registration command is inputted to the electronic control device 32. The registration command is a command to start the information registration processing. The registration command may be inputted, for example, by operating various switches (e.g., a turn signal lamp switch and a wiper switch) provided in the vehicle in a predetermined sequence or by operating a special switch to input a registration command.

Figure 2:
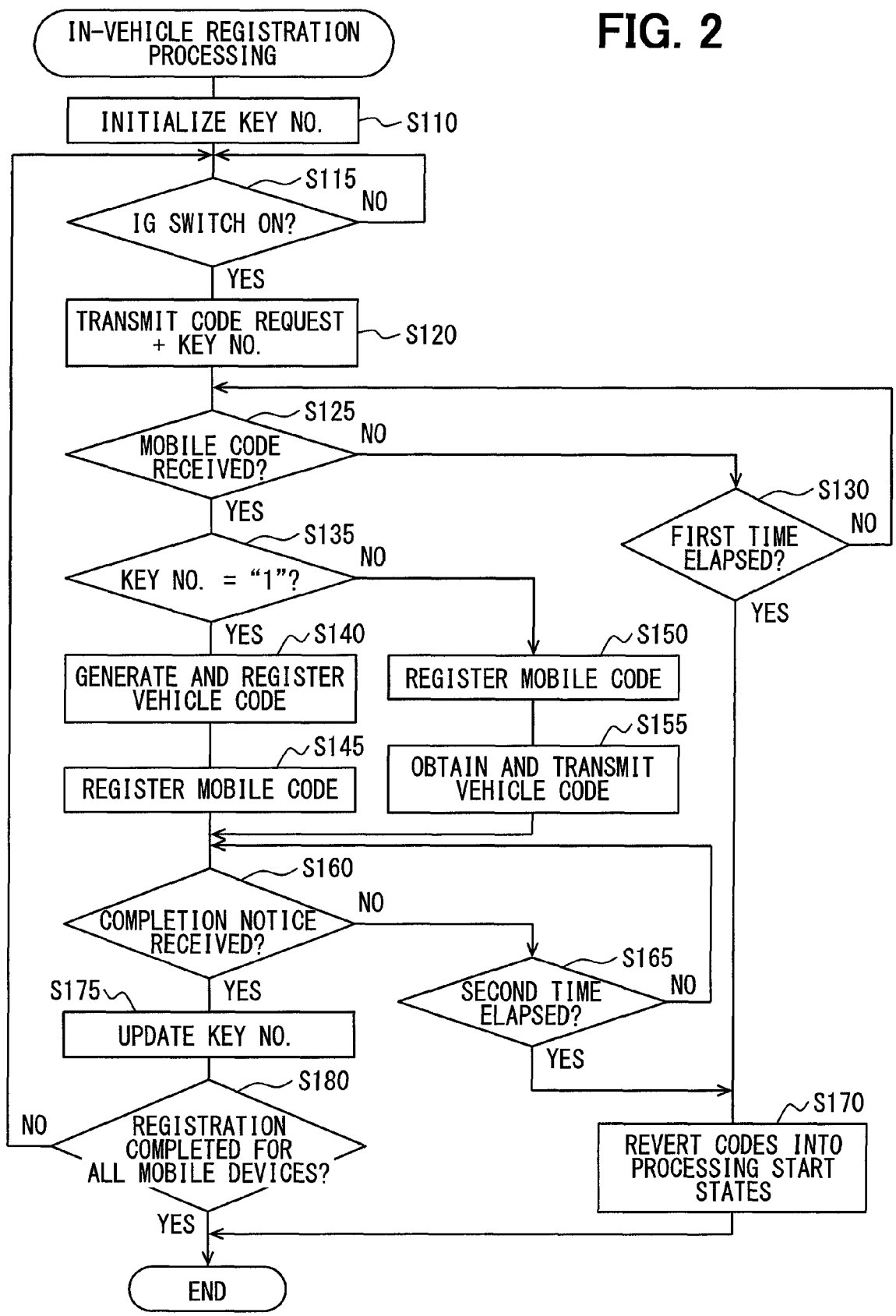
FIG. 2 is a flowchart showing a procedure of in-vehicle registration processing according to a first embodiment.

In the in-vehicle registration processing shown in FIG. 2, first, after the processing is started, the key number ("KEY NO." in FIG. 2) representing response timing is initialized (S110). In key number initialization, the key number is set to "1."

Subsequently, it is determined (S115) whether the IG switch 30 has been turned on. When the IG switch 30 has not been turned on (S115: NO), turning on of the IG switch 30 is awaited. When the IG switch 30 is turned on (S115: YES), a mobile device response request is transmitted to a mobile device 50 via the short-range wireless antenna 26 (S120). The mobile device response request is a signal containing a code request and a current key number. The code request requests a mobile device 50 to transmit a response indicating the mobile device code allocated to the mobile device 50.

Subsequently, it is determined (S125) whether a mobile device code and an update number ("UPDATE NO." in FIG. 2) have been received from the mobile device 50 via the short-range wireless antenna 26. The update number represents the number of times the information registration processing was executed. In the present embodiment, the update number is managed in the mobile device 50.

When, in S125, it is determined that no mobile device code and no update number have been received (S125: NO), it is determined (S130) whether a first predetermined amount of time has elapsed after transmission of the mobile device response request in S120. When, in S130, it is determined that the first predetermined amount of time has elapsed (S130: YES), processing advances to S170 being described in detail later. When, in S130, it is determined that the first predetermined amount of time has not elapsed (S130: NO), processing returns to S125.

When, in S125, it is determined that a mobile device code and an update number have been received (S125: YES), it is determined (S135) whether the current key number is "1". When, in S135, it is determined that the key number is "1" (S135: YES), a vehicle code is generated and registered in the storage device 34 (S140). The vehicle code is generated by attaching the mobile device code (i.e. an initially obtained code) received in S125 to the update number.

If, at the time of registering a newly generated vehicle code in the in-vehicle device 10, an older vehicle code is left stored in the storage device 34, the older vehicle code is replaced by the new vehicle code. When no older vehicle code is left stored in the storage device 34, the new vehicle code is newly stored in the storage device 34.

In the manner described above, the new vehicle code is registered in the storage device 34 as registrant identification information. Namely, in the vehicle code registration processing, the vehicle code stored in the storage device 34 is updated. The registrant identification information represents the vehicle code registered in the storage device 34 of the in-vehicle device 10.

Subsequently, the mobile device code received in S125 is registered, i.e. stored in association with the registrant identification information, in the storage device 34 (S145). Processing then advances to S160.

When it is determined in S135 that the key number is not "1" (S135: NO), the mobile device code received in S125 (i.e. a later obtained code) is registered, i.e. stored, in association with the registrant identification information, in the storage device 34 (S150). Subsequently, the vehicle code stored in the storage device 34 is obtained and transmitted via the short-range wireless antenna 26 (S155). Processing then advances to S160.

In S160, whether a completion notification has been received via the short-range wireless antenna 26 is determined. The completion notification is a signal notifying that a mobile device 50 has completed registration of the information required for the authentication processing.

When, in S160, it is determined that no completion notification has been received (S160: NO), it is then determined (S165) whether a second predetermined amount of time has elapsed after S160 was first entered in the current processing cycle out of a series of processing cycles through which S115 to S180 are repeatedly executed. When, in S165, it is determined that the second predetermined amount of time has not elapsed (S130: NO), processing returns to S160. When it is determined that the second predetermined amount of time has elapsed (S165: YES), processing advances to S170.

In S170, various information corresponding to the key number held at a time when processing has entered S170 is reverted into the information that was in a registered state when this in-vehicle registration processing was started. Namely, S170 serves as a restoration unit to revert the registration about the mobile device 50 to which the mobile device response request was transmitted to the previous state that existed before the mobile device code from the mobile device 50 was received.

The in-vehicle registration processing is then terminated.

When, in S160, it is determined that a completion notification has been received (S160: YES), the key number is updated (S175) by being incremented by one.

Subsequently, it is determined (S180) whether information registration has been completed for all mobile devices 50 corresponding to the number of mobile devices 50 for which the information registration is desired by a user of the electronic key system 1 (hereinafter referred to as the "number of registration requests"). The number of registration requests may be inputted by external operation along with inputting of a registration command.

When, in S180, it is determined that the information registration has not been completed for as many mobile devices 50 as the number of registration requests (S180: NO), processing returns to S115. When it is determined in S180 that the information registration has been completed for as many mobile devices 50 as the number of registration requests (S180: YES), the in-vehicle registration processing is terminated.

Namely, in the in-vehicle registration processing of the present embodiment, for a mobile device 50 for which key number "1" is registered, a vehicle code is generated by attaching the update number to the mobile device code (the initially obtained code) received as a response from the mobile device 50, and the vehicle code generated is registered as the registrant identification information. Also in the in-vehicle registration processing, the mobile device code (a later obtained code) received from each mobile device 50 is registered in association with the corresponding registrant identification information.

<Mobile Device Registration Processing>

In mobile device registration processing, communication is executed with the in-vehicle device 10 present in the communication range of the short-range wireless communication unit 60 of the mobile device 50, and the information required for the authentication processing is stored in the mobile device 50. This processing is executed by the control circuit 62 of the mobile device 50.

Figure 3:
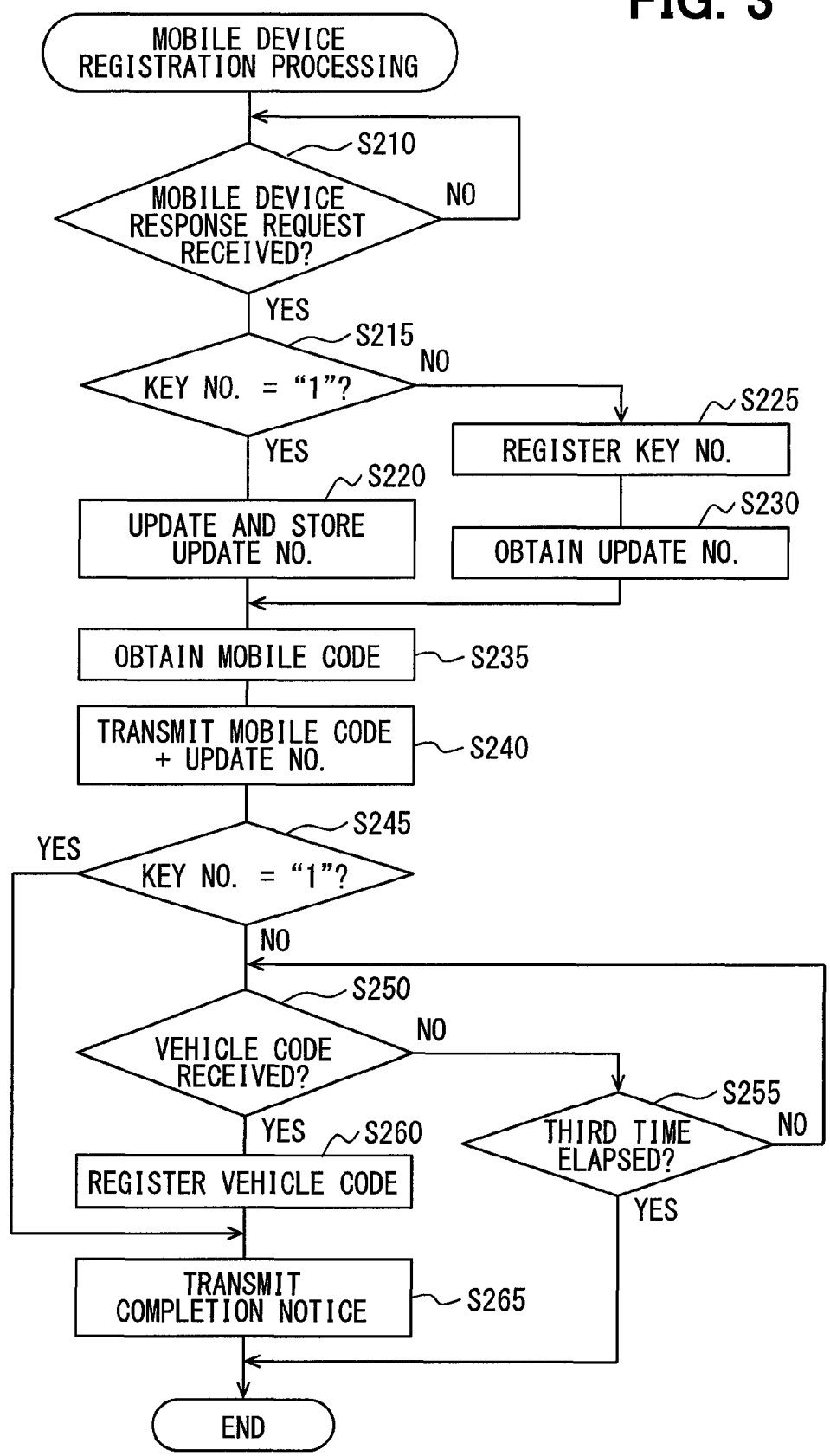
FIG. 3 is a flowchart showing a procedure of mobile device registration processing according to the first embodiment.

When the mobile device registration processing is started, first, as shown in FIG. 3, it is determined (S210) whether a mobile device response request has been received from the in-vehicle device via the short-range wireless communication unit 60. When it is determined that no mobile device response request has been received (S210: NO), processing is kept waiting for a mobile device response request. When a mobile device response request is received (S210: YES), it is determined (S215) whether the key number included in the mobile device response request is "1". When, in S215, it is determined that the key number is "1" (S215: YES), the update number is updated and stored in the storage device 64 (S220). For updating in S220, the update number is incremented by one. Processing then advances to S235 being described in detail later.

When, in S215, it is determined that the key number is not "1" (S215: NO), the key number included in the mobile device response request received in S210 is registered (S225). If, at the time of registering the new key number in the mobile device 50, an older key number is left stored in the storage device 64, the older key number is replaced by the new key number. When no older key number is left stored in the storage device 64, the new key number is newly stored in the storage device 64.

Subsequently, the update number stored in the storage device 64 is obtained (S230), then processing advances to S235. In S235, the mobile device code allocated to the mobile device 50 is obtained. Subsequently, information including the mobile device code obtained in S235 and the current update number is transmitted via the short-range wireless communication unit 60 (S240).

Furthermore, it is determined (S245) whether the key number included in the mobile device response request received in S210 is "1". When, in S245, it is determined that the key number is not "1" (S245: NO), it is determined (S250) whether a vehicle code has been received via the short-range communication unit 60.

When, in S250, it is determined that no vehicle code has been received (S250: NO), it is determined (S255) whether a third predetermined amount of time has elapsed after transmission in S240 of the mobile device code and the update number. When, in S255, it is determined that the third predetermined amount of time has elapsed (S255: YES), the mobile device registration processing is terminated. When, in S255, it is determined that the third predetermined amount of time has not elapsed (S255: NO), processing returns to S250.

When, in S250, it is determined that a vehicle code has been received (S250: YES), the received vehicle code is registered in the storage device 64 of the control circuit 62 in association with the key number registered in S225 (S260). If, at the time of registering the vehicle code in the mobile device 50, an older vehicle code is left stored in the storage device 64, the older vehicle code is replaced by the new vehicle code. When no older vehicle code is left stored in the storage device 64, the new vehicle code is newly stored in the storage device 64.

Subsequently, processing advances to S265. When, in S245, it is determined that the key number included in the mobile device response request received in S210 is "1" (S245: YES), processing advances to S265. In S265, a completion notification is transmitted via the short-range wireless communication unit 60.

The mobile device registration processing is then terminated.

Namely, in the mobile device registration processing of the present embodiment, when the key number included in the mobile device response request transmitted from the in-vehicle device 10 to a mobile device 50 is "1," the mobile device code allocated to the mobile device 50 itself and the update number are transmitted as a response to the in-vehicle device 10. Also, in the mobile device registration processing, when the key number included in the mobile device response request received from the in-vehicle device 10 is "2" or higher, the mobile device code allocated to the mobile device 50 itself is transmitted as a response to the in-vehicle device 10 and, at the same time, the vehicle code received from the in-vehicle device 10 is registered in association with the key number received by the mobile device 50.

<Execution Examples of Information Registration Processing>

In the following, initial registration and re-registration will be described as execution examples of information registration processing.

Initial registration according to the present embodiment will be described based on an example case of information registration processing in which the information required for the authentication processing is initially registered in two mobile devices 50. In the following description, one of the two mobile devices 50 in which information is registered in the initial registration processing will be referred to as "mobile device A" and the other of the two mobile devices 50 will be referred to as "mobile device B."

Re-registration according to the present embodiment will be described based on an example case of information re-registration processing in which the information required for the authentication processing is re-registered in two mobile devices 50. In describing the re-registration, the two mobile devices 50 will be referred to as "mobile device C" and "mobile device A." The mobile device C is different from mobile devices A and B.

Figure 4A:
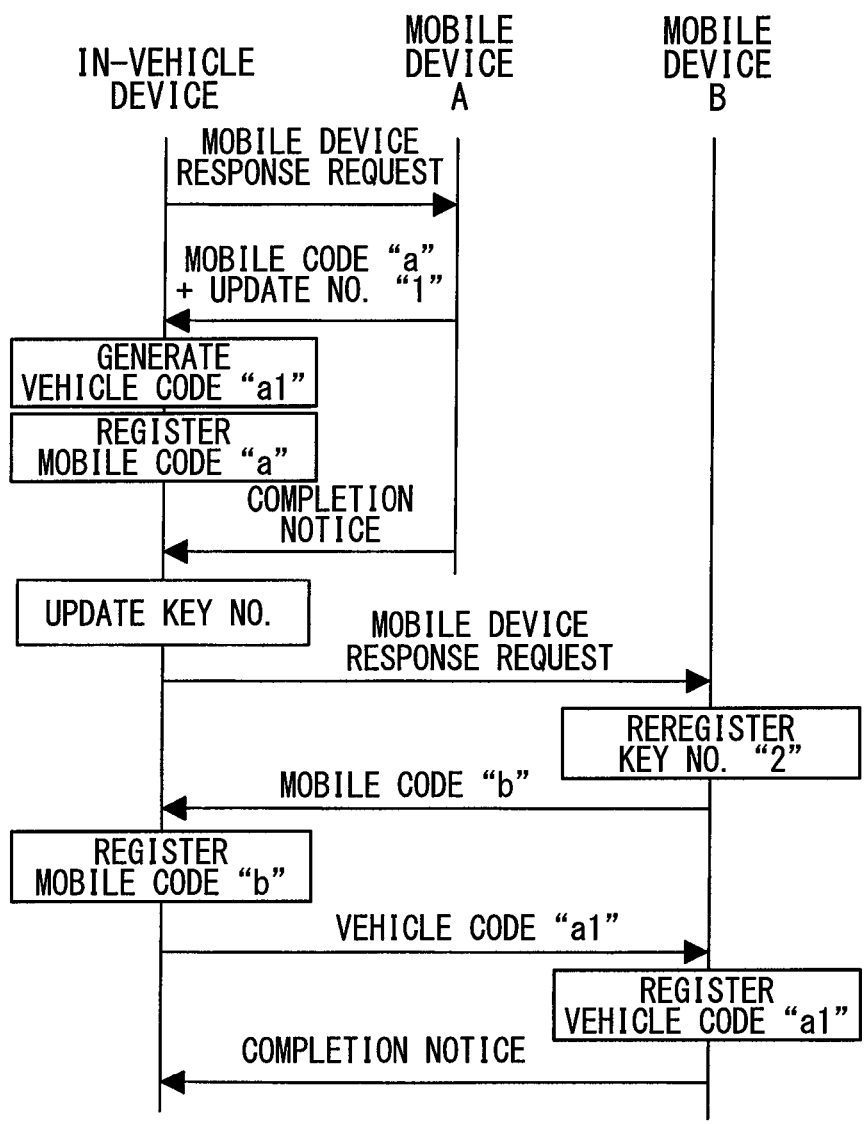
FIG. 4A is a drawing for explaining initial registration according to the first embodiment.

In the initial registration referred to above, an operator to execute the information registration processing places the mobile device A in the communication range of the short-range wireless antenna 26. When the IG switch 30 is turned on after a registration command is inputted, the in-vehicle device 10 sets the key number to "1" and transmits a mobile device response request to the mobile device A as shown in FIG. 4A. When the mobile device response request is received, the mobile device A transmits, as a response to the in-vehicle device 10, mobile device code "a" allocated to the mobile device A itself and update number "1" managed in the mobile device A.

When the mobile device code "a" and the update number "1" are received, the in-vehicle device 10 generates vehicle code "a1" by attaching the update number "1" to the mobile device code "a" and stores (registers) the vehicle code "a1" in the storage device 34. Furthermore, the in-vehicle device 10 registers the mobile device code "a" in association with the vehicle code "a1." Subsequently, when a completion notification is received from the mobile device A, the in-vehicle device 10 updates the key number managed by the in-vehicle device 10 to "2" and proceeds to register information in the mobile device B.

To register information in the mobile device B, the operator executing the information registration processing places the mobile device B in the communication range of the short-range wireless antenna 26 in replace of the mobile device A. When the IG switch 30 is turned on, the in-vehicle device 10 transmits a mobile device response request to the mobile device B. When the mobile device response request is received, the mobile device B registers the key number "2" and transmits, as a response to the in-vehicle device 10, the mobile device code "b" allocated to the mobile device B itself.

When the mobile device code "b" is received, the in-vehicle device 10 registers the mobile device code "b" in association with the vehicle code "a1" stored in the storage device 34 and, at the same time, transmits the vehicle code "a1" to the mobile device B. When the vehicle code "a1" is received, the mobile device B registers the vehicle code "a1" in association with the key number "2" and transmits a completion notification.

When the completion notification is received from the mobile device B, the in-vehicle device 10 terminates the in-vehicle registration processing including the initial registration.

In this way, the vehicle code "a1" and the mobile device code of each mobile device 50 are registered in the in-vehicle device 10. In the mobile device A, the updated update number ("1" in the case of initial registration) is stored. In the mobile device B, the vehicle code "a1" is registered along with key number "2" as response timing for the mobile device B in the authentication processing.

Figure 4B:
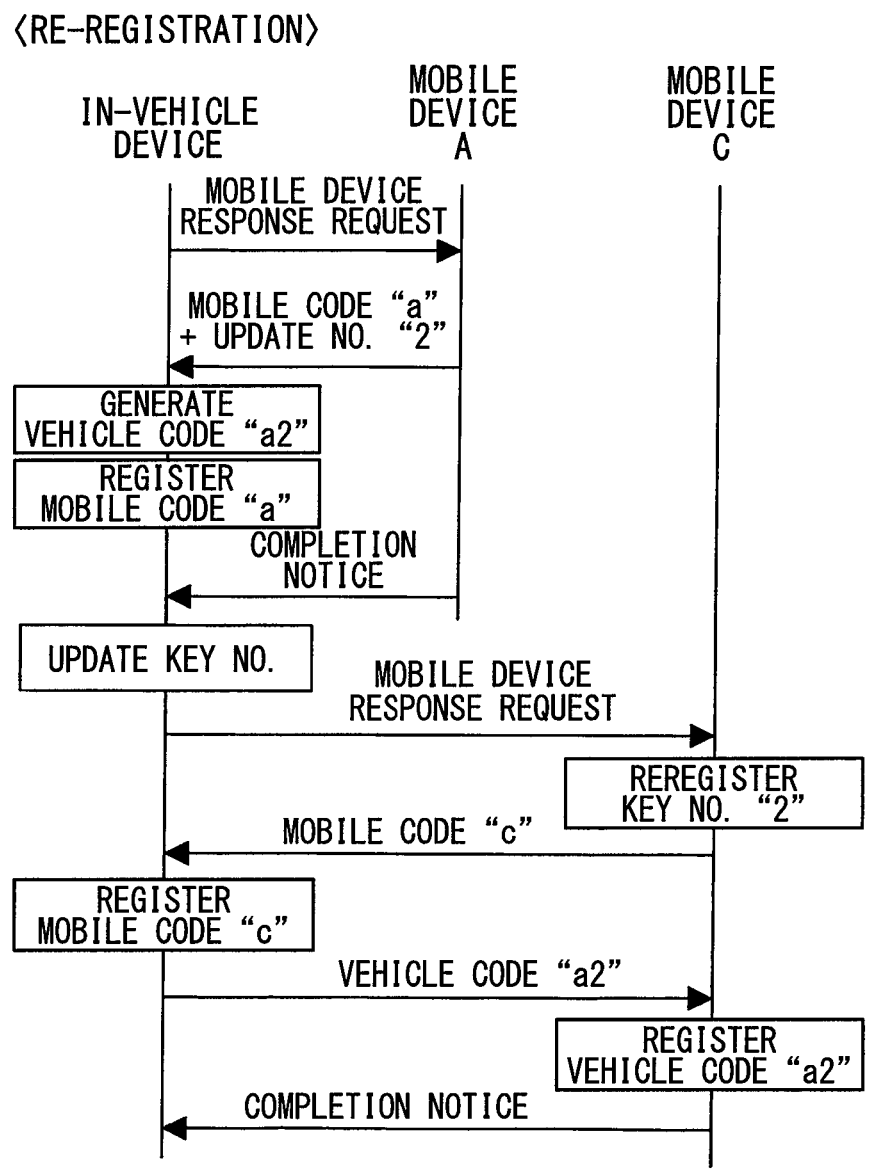
FIG. 4B is a drawing for explaining re-registration according to the first embodiment.

In the re-registration, the operator to execute the information registration processing places the mobile device A in the communication range of the short-range wireless antenna 26. When the IG switch 30 is turned on after a registration command is inputted, the in-vehicle device 10 sets the key number to "1" and transmits a mobile device response request as shown in FIG. 4B. When the mobile device response request is received, the mobile device A updates the update number managed by the mobile device A itself from "1" to "2" and transmits, as a response to the in-vehicle device 10, the update number "2" and the mobile device code "a" allocated to the mobile device A itself.

When the mobile device code "a" and the update number "2" are received, the in-vehicle device 10 generates a new vehicle code "a2" by attaching the update number "2" to the mobile device code "a" and changes the vehicle code registered in the storage device 34 from "a1" to "a2." Furthermore, the in-vehicle device 10 registers the mobile device code "a" in association with the vehicle code "a2." Subsequently, when a completion notification is received from the mobile device A, the in-vehicle device 10 updates the key number managed by the in-vehicle device 10 to "2" and proceeds to register information in the mobile device C.

To register information in the mobile device C, the operator executing the information registration processing places the mobile device C, replacing the mobile device A, in the communication range of the short-range wireless antenna 26. When the IG switch 30 is turned on, the in-vehicle device 10 transmits a mobile device response request to the mobile device C. When the mobile device response request is received, the mobile device C registers the key number "2" and transmits, as a response to the in-vehicle device 10, the mobile device code "c" allocated to the mobile device C itself.

When the mobile device code "c" is received, the in-vehicle device 10 registers the mobile device code "c" in association with the vehicle code "a2" stored in the storage device 34 and, at the same time, transmits the vehicle code "a2" to the mobile device C. When the vehicle code "a2" is received, the mobile device C registers the vehicle code "a2" in association with the key number "2" and transmits a completion notification.

When the completion notification is received from the mobile device C, the in-vehicle device 10 terminates the in-vehicle registration processing including the re-registration.

In this way, the new vehicle code "a2" and the mobile device code of each mobile device 50 are registered in the in-vehicle device 10. In the mobile device A, the updated update number ("2") is stored. In the mobile device C, the vehicle code "a2" is registered along with key number "2" as response timing for the mobile device C in the authentication processing.

Namely, the electronic key system 1 functions as an information registration system to register the information required for the authentication processing in the in-vehicle device 10 and mobile devices 50.

Figure 5:
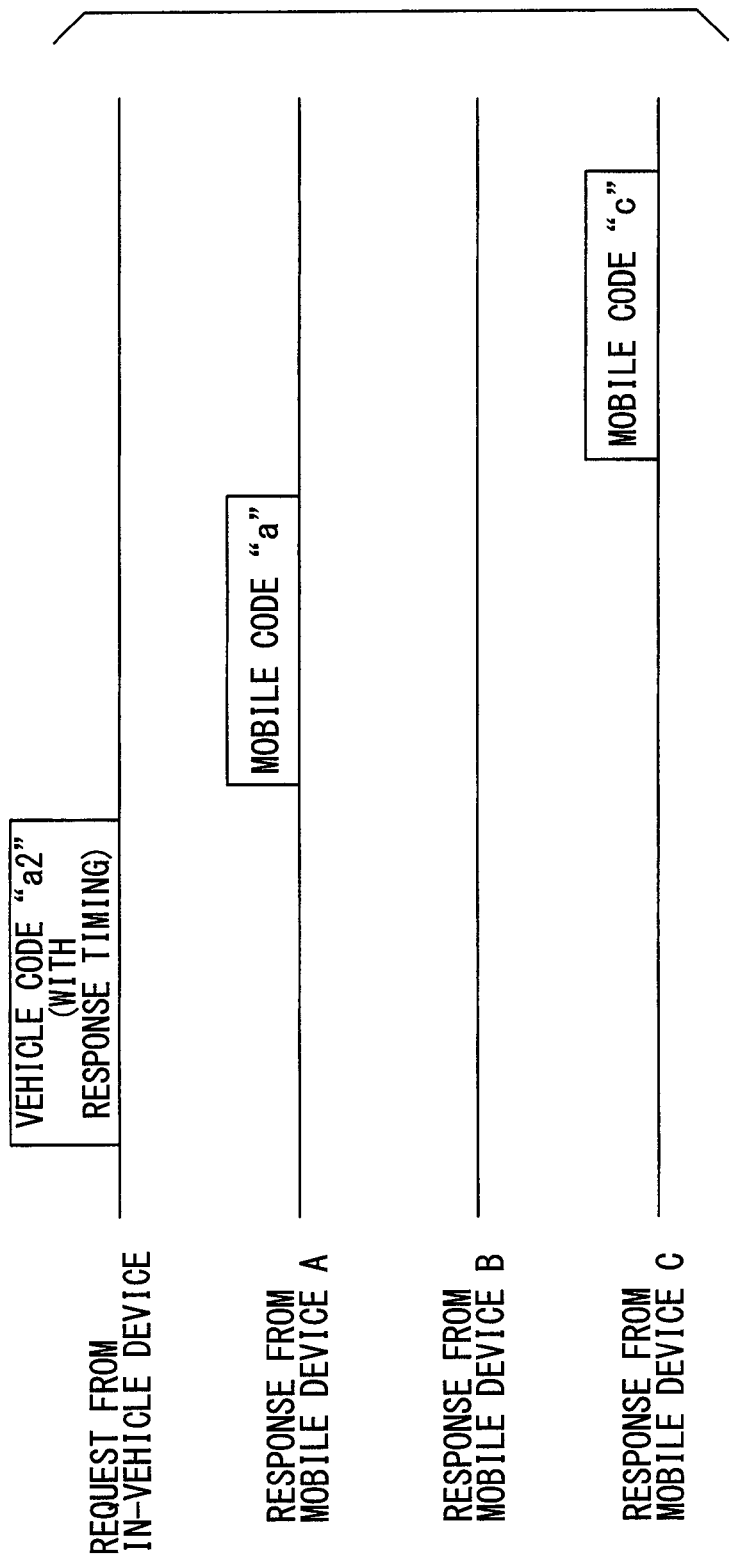
FIG. 5 is a drawing for explaining technical effects of an electronic key system according to the first embodiment.

When the authentication processing is executed in the electronic key system 1 in which the re-registration processing has been executed as described above, first, the in-vehicle device 10 transmits a response request including the vehicle code and response timing as shown in FIG. 5. When the response request is received, each of the mobile devices A and C transmits their allocated mobile device code at the response timing registered in itself.

In the present embodiment, when mobile devices 50 receive a response request in the authentication processing, each of the mobile devices 50 determines whether the vehicle code stored in the mobile device 50 matches the received vehicle code. When the two vehicle codes do not match or when no vehicle code is stored in the mobile device 50, the mobile device 50 generates a mobile device code by removing the update number from the received vehicle code and compares the generated mobile device code with the mobile device code allocated to the mobile device 50 itself. Furthermore, each of the mobile devices 50 is configured such that, when the two mobile device codes match each other, the mobile device 50 immediately transmits the mobile device code allocated to itself. When the two vehicle codes match, the mobile device 50 transmits the mobile device code allocated to the mobile device 50 itself at the response timing (key number) registered in the mobile device 50.

Technical Effects of the First Embodiment

As described above, the electronic key system 1 can prevent registration of the same information in two or more mobile devices 50.

In the electronic key system 1, therefore, response timing coincidence between the mobile devices A and C can be prevented as shown in FIG. 5. Furthermore, the electronic key system 1 can prevent the mobile device B from transmitting its mobile device code as a response. Thus, the electronic key system 1 can reduce interference during the authentication processing, so that authentication processing failures can be reduced.

Particularly, in the information registration processing of the present embodiment, a new vehicle code is generated by attaching an update number to the mobile device code of the mobile device 50 for which key number "1" is registered. The update number is updated every the time information registration processing is executed. In the electronic key system 1, therefore, a new vehicle code has different content each time the information registration processing is executed. The amount of processing to be executed to generate a new vehicle code is small.

Furthermore, in the information registration processing executed in the electronic key system 1 according to the present embodiment, the mobile device code and update number are obtained from each mobile device 50. Therefore, out of the information required for vehicle code generation, the volume of information to be managed by the in-vehicle device 10 can be reduced.

Still, even in the electronic key system 1, the information registration in a mobile device 50 may fail, for example, due to a communication breakdown between the mobile device 50 and the in-vehicle device 10 or interference by noise. When the information registration in a mobile device 50 fails, one may suppose a situation in which the mobile device 50 keeps an old vehicle code and an old key number and this results in a non-match between the old vehicle code registered in the mobile device 50 and the new vehicle code registered in the in-vehicle device 10.

However, in the electronic key system 1, in S170 of the in-vehicle registration processing, various information corresponding to the key number at the time when S170 is entered is reverted into the information that was in a registered state when the in-vehicle registration processing was started.

Therefore, even when the registration of information in a mobile device 50 in which the key number is to be registered fails, the un-updated last information about the mobile device 50 in which the key number is to be registered is retained in the in-vehicle device 10. Thus, in the electronic key system 1, the foregoing situation in which a vehicle code non-match occurs is prevented, and the mobile device 50 is allowed to function as an electronic key.

Modification Example of the First Embodiment

The first embodiment of the present disclosure has been described above. The embodiment, however, is not limited to the above configuration, and it can be modified in various ways without departing from the scope of this disclosure.

For example, even though, in the information registration processing, the update numbers are managed in respective mobile devices 50, the update numbers may be updated in the in-vehicle device 10. In such a case, the in-vehicle registration processing can be executed using the procedure shown in FIG. 6.

Figure 6:
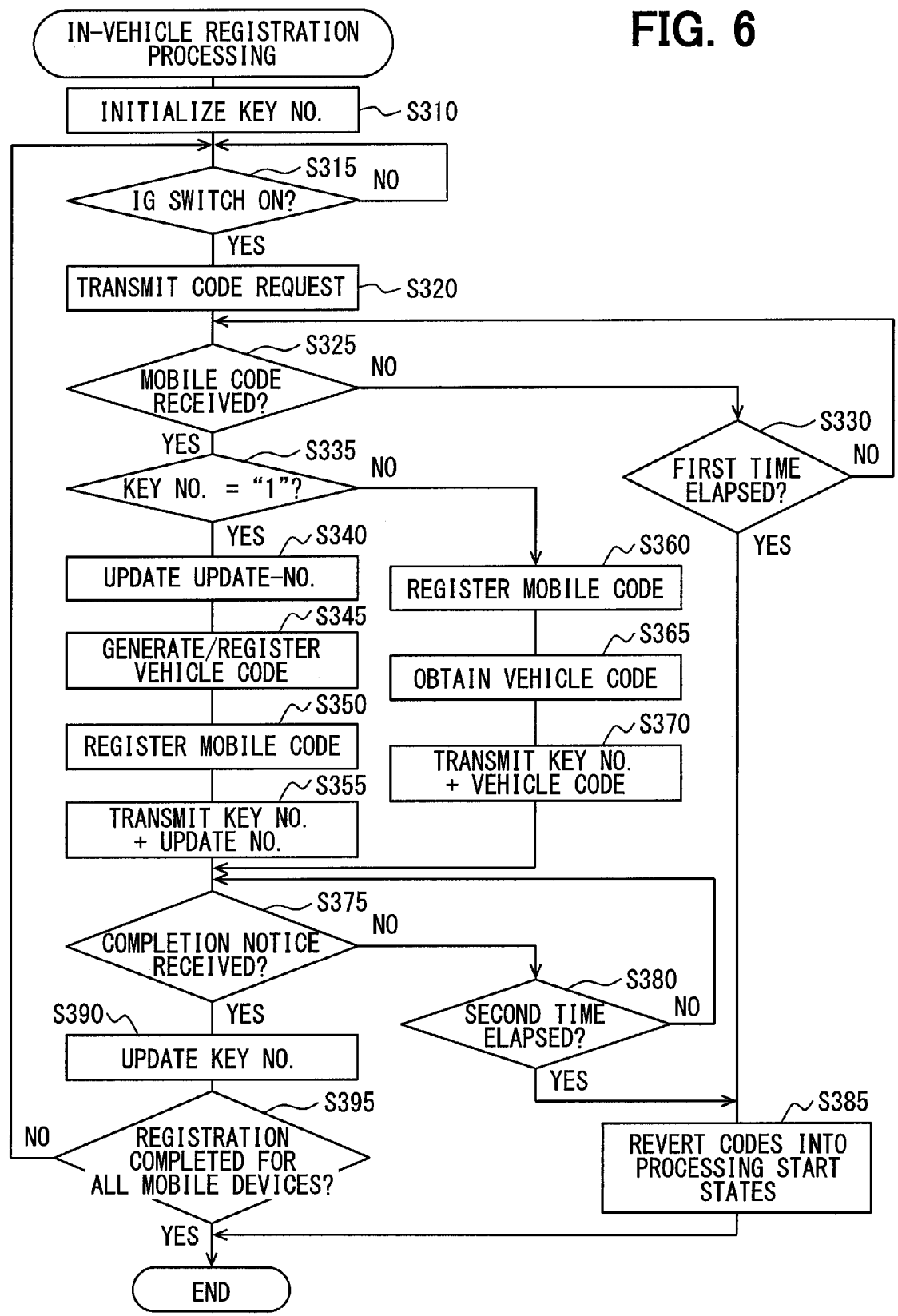
FIG. 6 is a flowchart showing a procedure of a modification example of in-vehicle registration processing according to the first embodiment.

To be concrete, when the in-vehicle registration processing shown in FIG. 6 is started, the key number ("KEY NO." in FIG. 6) is initialized (S310). Subsequently, when the IG switch 30 is not on (S315: NO), turning on of the IG switch 30 is awaited. When the IG switch 30 is turned on (S315: YES), a code request is transmitted to a mobile device 50 via the short-range wireless antenna 26 (S320).

Subsequently, it is determined (S325) whether a mobile device code and an update number ("UPDATE NO." in FIG. 6) have been received from the mobile device 50 via the short-range wireless antenna 26. When it is determined that no mobile device code and no update number have been received (S325: NO), it is determined (S330) whether the first predetermined amount of time has elapsed after transmission of the mobile device response request in S320. When it is determined that the first predetermined amount of time has elapsed (S330: YES), processing advances to S385 being described in detail later. When it is determined that the first predetermined amount of time has not elapsed (S330: NO), processing returns to S325.

When, in S325, it is determined that a mobile device code and an update number have been received (S325: YES), it is determined (S335) whether the current key number is "1". When, in S335, it is determined that the key number is "1" (S335: YES), the update number received in S325 is incremented by one (S340).

Subsequently, a vehicle code is generated and registered in the storage device 34 (S345). The vehicle code is generated by attaching the update number updated in S340 to the mobile device code received in S325 (the initially obtained code). The generated vehicle code is registered in the in-vehicle device 10 as in the first embodiment, so that detailed description in this regard will be omitted here.

Subsequently, the mobile device code received in S325 is stored and registered in the storage device 34 in association with the registrant identification information (S350), and the current key number and update number are transmitted via the short-range wireless antenna 26 (S355). Processing then advances to S375.

When, in S335, it is determined that the key number is not "1" (S335: NO), the mobile device code received in S325 (the initially obtained code) is stored and registered in the storage device 34 in association with the registrant identification information (S360). Subsequently, the vehicle code registered in the storage device 34 is obtained (S365), and the vehicle code obtained and the current key number are transmitted via the short-range wireless antenna 26 (S370). Processing then advances to S375.

In S375, it is determined whether a completion notification has been received via the short-range wireless antenna 26. When, in S375, it is determined that no completion notification has been received (S375: NO), it is determined (S380) whether the second predetermined amount of time has elapsed after completion of the transmission in S355 or S370. When, in S380, it is determined that the second predetermined amount of time has elapsed (S380: YES), processing advances to S385. In S385, various information corresponding to the key number at the time when S385 was entered is reverted into the information that was in a registered state when the in-vehicle registration processing was started.

The in-vehicle registration processing is then terminated.

When, in S380, it is determined that the second predetermined amount of time has not elapsed (S380: NO), processing returns to S375. When, in S375, it is determined that a completion notification has been received (S375: YES), the key number is incremented by one (S390).

Subsequently, it is determined whether information registration has been completed for all mobile devices 50 equaling the number of registration requests (S395). When information registration has not been completed for all mobile devices 50 equaling the number of registration requests (S395: NO), processing returns to S315. When information registration has been completed for all mobile devices 50 equaling the number of registration requests (S395: YES), the in-vehicle registration processing is terminated.

Figure 7:
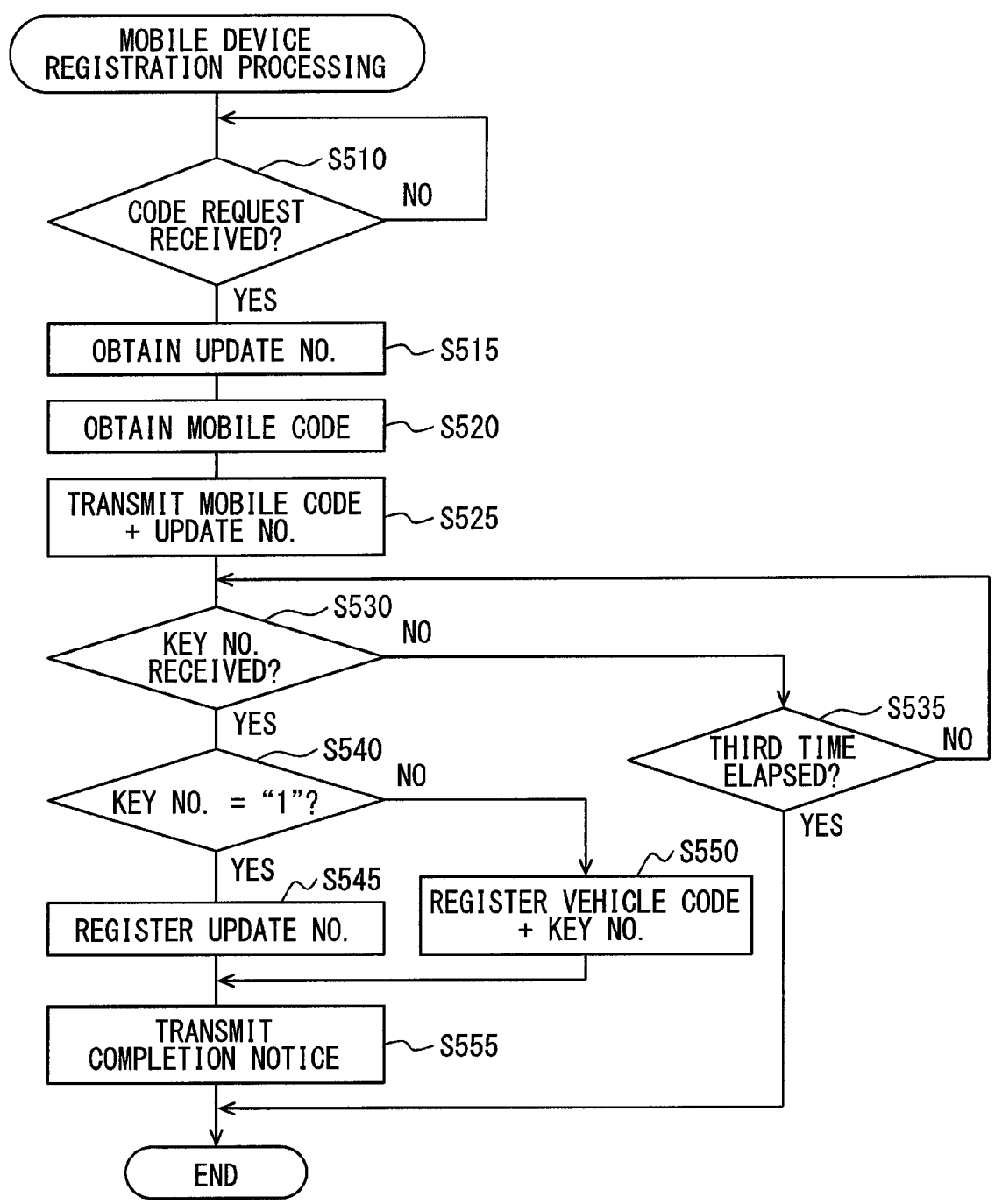
FIG. 7 is a flowchart showing a procedure of a modification example of mobile device registration processing according to the first embodiment.

In cases where the in-vehicle registration processing procedure as shown in FIG. 6 is used, it is necessary to execute the mobile device registration processing using the procedure as shown in FIG. 7.

Namely, when the mobile device registration processing procedure shown in FIG. 7 is started, first, it is determined (S510) whether a code request from the in-vehicle device 10 has been received via the short-range wireless communication unit 60. When, in S510, it is determined that no code request has been received (S510: NO), reception of a code request is awaited. When a code request is received (S510: YES), the update number stored in the storage device 64 is obtained (S515).

Subsequently, the mobile device code allocated to the mobile device 50 itself is obtained (S520), and the mobile device code obtained and the update number obtained in S515 are transmitted via the short-range wireless communication unit 60 (S525).

Subsequently, it is determined (S530) whether information including a key number has been received via the short-range wireless communication unit 60. When it is determined that no information including a key number has been received (S530: NO), it is determined (S535) whether the third predetermined amount of time has elapsed after transmission of the mobile device code and the update number in S525. When it is determined that the third predetermined amount of time has elapsed (S535: YES), the mobile device registration processing is terminated. When it is determined that the third predetermined amount of time has not elapsed (S535: NO), processing returns to S530.

When, in S530, it is determined that information including a key number has been received (S530: YES), it is determined (S540) whether the received key number is "1". When the key number is "1" (S540: YES), the update number received with the key number is registered in the storage device 64 (S545). If, at the time of registering the update number, an older update number is left stored in the storage device 64, the older update number is replaced by the new update number. When no older update number is left stored in the storage device 64, the newly received update number is stored in the storage device 64.

Subsequently, a completion notification is transmitted via the short-range wireless communication unit 60 (S555), and the mobile device registration processing is terminated.

When, in S540, it is determined that the key number is not "1" (S540: NO), the vehicle code received along with the key number in S530 is registered in the storage device 64 in association with the key number (S550). When the vehicle code and key number are registered, the information stored in the storage device 64 is updated as in the first embodiment.

Subsequently, a completion notification is transmitted via the short-range wireless communication unit 60, and the mobile device registration processing is terminated.

The information registration processing as described above can also provide technical effects similar to those provided by the information registration processing according to the first embodiment. Furthermore, the information registration processing as described above makes it unnecessary for each mobile device 50 to manage the update number.

Second Embodiment

An electronic key system according to a second embodiment differs from the electronic key system 1 according to the first embodiment mainly in terms of the contents of information registration processing. Therefore, for the second embodiment, configurations and operations identical to those of the first embodiment will be denoted by reference symbols identical to those used for the first embodiment, and the description of such configurations and operations will be omitted. The following description will, therefore, center on information registration processing, that is, in-vehicle registration processing and mobile device registration processing differing from such processing according to the first embodiment.

<In-Vehicle Registration Processing>

In the in-vehicle registration processing according to the present embodiment, processing to transmit a newly generated vehicle code to the mobile device 50 for which key number "1" is registered is also executed in addition to the in-vehicle registration processing according to the first embodiment.

Figure 8:
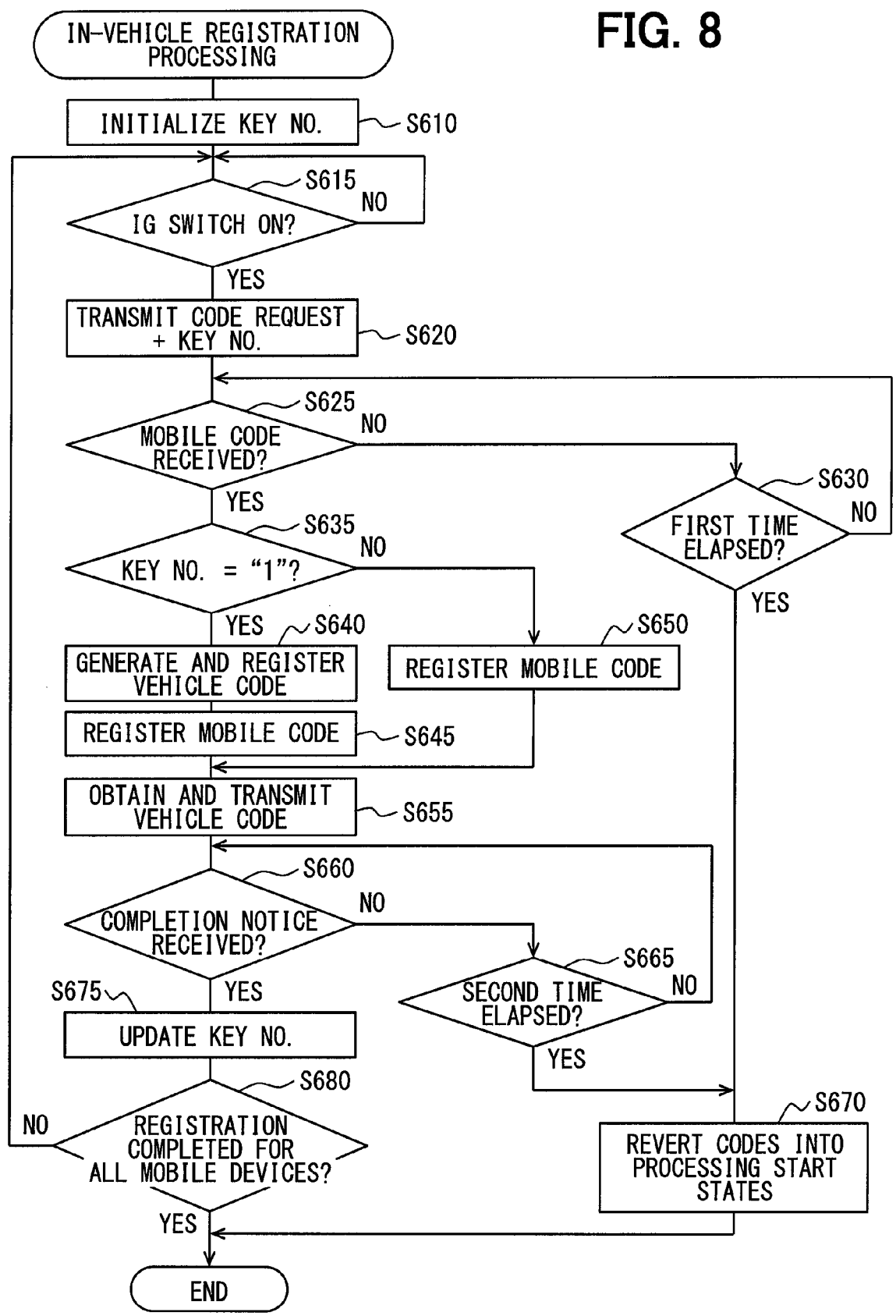
FIG. 8 is a flowchart showing a procedure of in-vehicle registration processing according to a second embodiment.

In concrete terms, the in-vehicle registration processing of the present embodiment is started when a registration command is inputted. Then, as shown in FIG. 8, the key number (KEY NO. in FIG. 8) is initialized (S610), and it is determined (S615) whether the IG switch 30 has been turned on. When the IG switch 30 has not been turned on (S615: NO), turning on of the IG switch 30 is awaited. When the IG switch 30 is turned on (S615: YES), a mobile device response request is transmitted via the short-range wireless antenna 26 (S620).

Subsequently, it is determined (S625) whether a mobile device code and an update number (UPDATE NO. in FIG. 8) have been received from the mobile device 50. When no mobile device code and no update number have been received (S625: NO), it is determined (S630) whether the first predetermined amount of time has elapsed after transmission of the mobile device response request in S620. When, in S630, it is determined that the first predetermined amount of time has elapsed (S630: YES), processing advances to S670 being described in detail later. When the first predetermined amount of time has not yet elapsed (S630: NO), processing returns to S625.

When, in S625, it is determined that a mobile device code and an update number have been received (S625: YES), it is determined (S635) whether the current key number is "1". When, in S635, it is determined that the key number is "1" (S635: YES), a vehicle code is generated and registered in the storage device 34 (S640). The vehicle code is generated by attaching the update number to the mobile device code (the initially obtained code) received in S625. The newly generated vehicle code is registered in the storage device 34 as registrant identification information. The vehicle code is registered in the same manner as in the first embodiment, so that detailed description of the procedure will be omitted herein.

Subsequently, the mobile device code received in S625 is stored for registration in the storage device 34 in association with the registrant identification information (S645). Processing then advances to S655.

When, in S635, it is determined that the key number is not "1" (S635: NO), the mobile device code (later obtained code) received in S625 is stored for registration in the storage device 34 in association with the registrant identification information (S650).

Subsequently, in S655, the vehicle code stored in the storage device 34 is obtained and transmitted via the short-range wireless antenna 26. Then, it is determined (S660) whether a completion notification has been received via the short-range wireless antenna 26.

When, in S660, it is determined that no completion notification has been received (S660: NO), it is determined (S665) whether the second predetermined amount of time has elapsed after transmission of the vehicle code in S655. When the second predetermined amount of time has elapsed (S665: YES), processing advances to S670.

In S670, various information corresponding to the current key number is reverted into the information that was in a registered state when the in-vehicle registration processing was started. Namely, S670 serves as a restoration unit to revert the registration about the mobile device 50 to which the mobile device response request was transmitted to the previous state that existed before the mobile device code from the mobile device 50 was received.

Subsequently, the in-vehicle registration processing is terminated.

When, in S665, it is determined that the second prescribed amount of time has not elapsed (S630: NO), processing returns to S660. When, in S660, it is determined that a completion notification has been received (S660: YES), the key number is incremented by one (S675).

Subsequently, it is determined whether information registration has been completed for all mobile devices 50 equaling the number of registration requests (S680). When information registration has not been completed for all mobile devices 50 equaling the number of registration requests (S680: NO), processing returns to S615. When information registration has been completed for all mobile devices 50 equaling the number of registration requests (S680: YES), the in-vehicle registration processing is terminated.

Namely, in the in-vehicle registration processing of the present embodiment, for a mobile device 50 for which key number "1" has been registered, a new vehicle code is generated by attaching the update number received from the mobile device 50 to the mobile device code received from the mobile device 50, and the vehicle code generated is registered as registrant identification information. Also, in the in-vehicle registration processing of the present embodiment, the mobile device code received from each mobile device 50 is registered in association with the registrant identification information. The newly generated vehicle code is transmitted also to the mobile device 50 for which key number "1" is registered in addition to the mobile device 50 for which key number "2" is registered.

<Mobile Device Registration Processing>

In the mobile device registration processing according to the present embodiment, besides the contents of the mobile device registration processing according to the first embodiment, additional processing is also executed in which each mobile device 50 transmits, as a response to the in-vehicle device 10, its own mobile device code and update number regardless of the key number registered in it.

Figure 9:
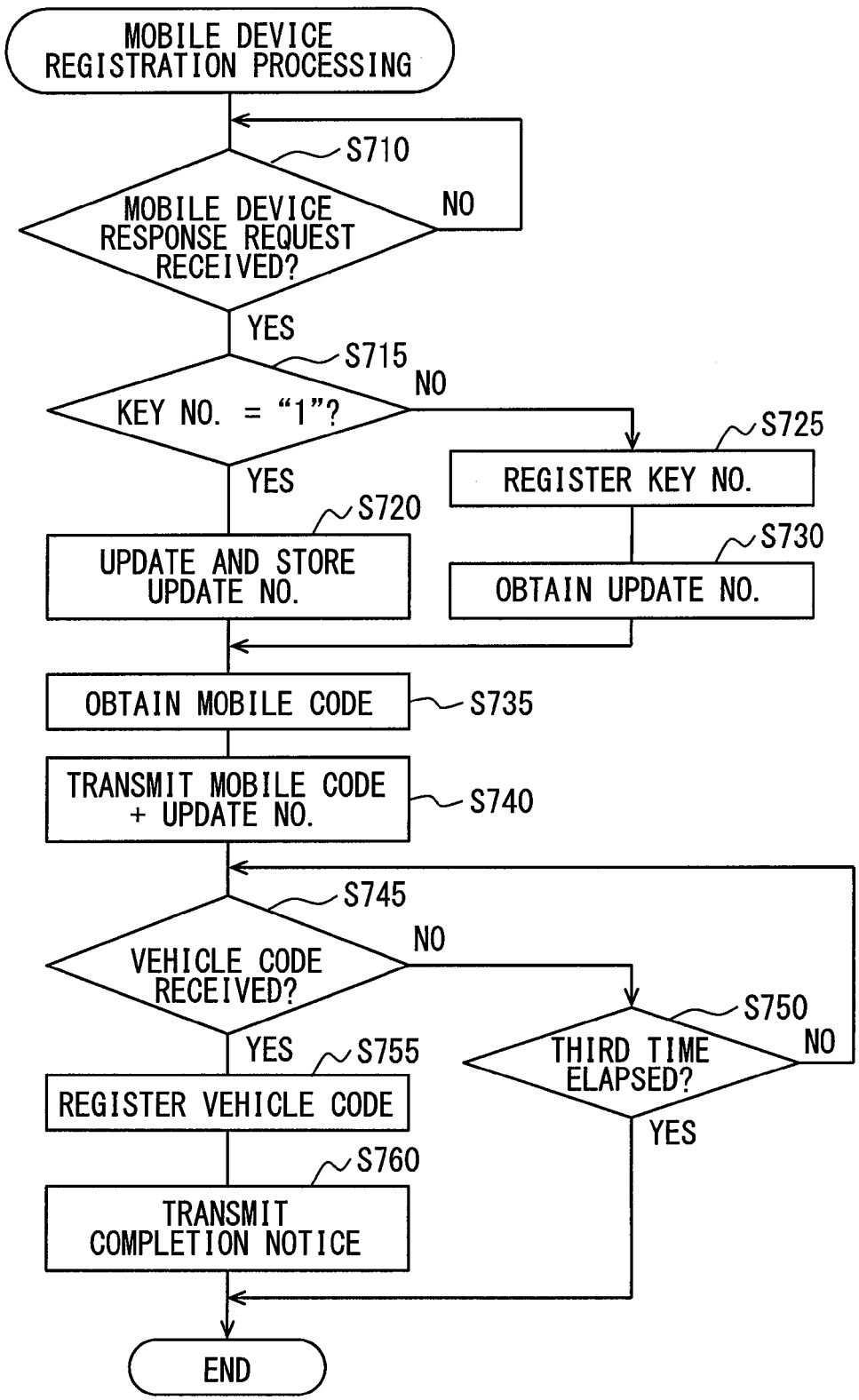
FIG. 9 is a flowchart showing a procedure of mobile device registration processing according to the second embodiment.

In concrete terms, as shown in FIG. 9, when the mobile device registration processing according to the present embodiment is started, it is determined (S710) whether a mobile device response request has been received from the in-vehicle device via the short-range wireless communication unit 60. When no mobile device response request has been received (S710: NO), reception of a mobile device response request is awaited. When a mobile device response request is received (S710: YES), it is determined (S715) whether the key number included in the mobile device response request is "1". When the key number is "1" (S715: YES), the update number is incremented by one and is registered in the storage device 64 (S720). Processing then advances to S735 being described in detail later.

On the other hand, when, in S715, it is determined that the key number is not "1" (S715: NO), the key number included in the mobile device response request received in S710 is registered in the storage device 64 (S725). Subsequently, the update number stored in the storage device 64 is obtained (S730), then processing advances to S735.

In S735, the mobile device code allocated to the mobile device itself is obtained. Then, information including the mobile device code obtained in S735 and the current update number is transmitted via the short-range wireless communication unit 60 (S740).

Subsequently, it is determined (S745) whether a vehicle code has been received via the short-range wireless communication unit 60. When no vehicle code has been received (S745: NO), it is determined (S750) whether the third predetermined amount of time has elapsed after transmission in S740 of the information including the mobile device code and the update number. When, in S750, it is determined that the third predetermined amount of time has elapsed (S750: YES), the mobile device registration processing is terminated. When the third predetermined amount of time has not yet elapsed (S750: NO), processing returns to S745.

When, in S745, it is determined that a vehicle code has been received (S745: YES), the vehicle code is registered in the storage device 64 included in the control circuit 62 in association with the key number (S755). If, at the time of registering the vehicle code in the storage device 64 included in the control circuit 62, an older vehicle code is left stored in the storage device 64, the older vehicle code is replaced by the new vehicle code. When no older vehicle code is left stored in the storage device 64, the received vehicle code is newly stored in the storage device 64.

Subsequently, a completion notification is transmitted via the short-range wireless communication unit 60 (S760), then the mobile device registration processing is terminated.

Namely, in the mobile device registration processing of the present embodiment, when the key number included in the mobile device response request received from the in-vehicle device 10 is "1," the update number is updated and stored. Also, in the mobile device registration processing, when a mobile device response request is received, the mobile device code allocated to the mobile device itself and the update number are transmitted as a response to the in-vehicle device 10 regardless of whether the key number is "1" or not. Also, in the mobile device registration processing, when a vehicle code is received from the in-vehicle device 10, the vehicle code is registered in association with the key number.

<Execution Examples of Information Registration Processing>

In the following, initial registration and re-registration will be described as execution examples of information registration processing according to the present embodiment.

Figure 10A:
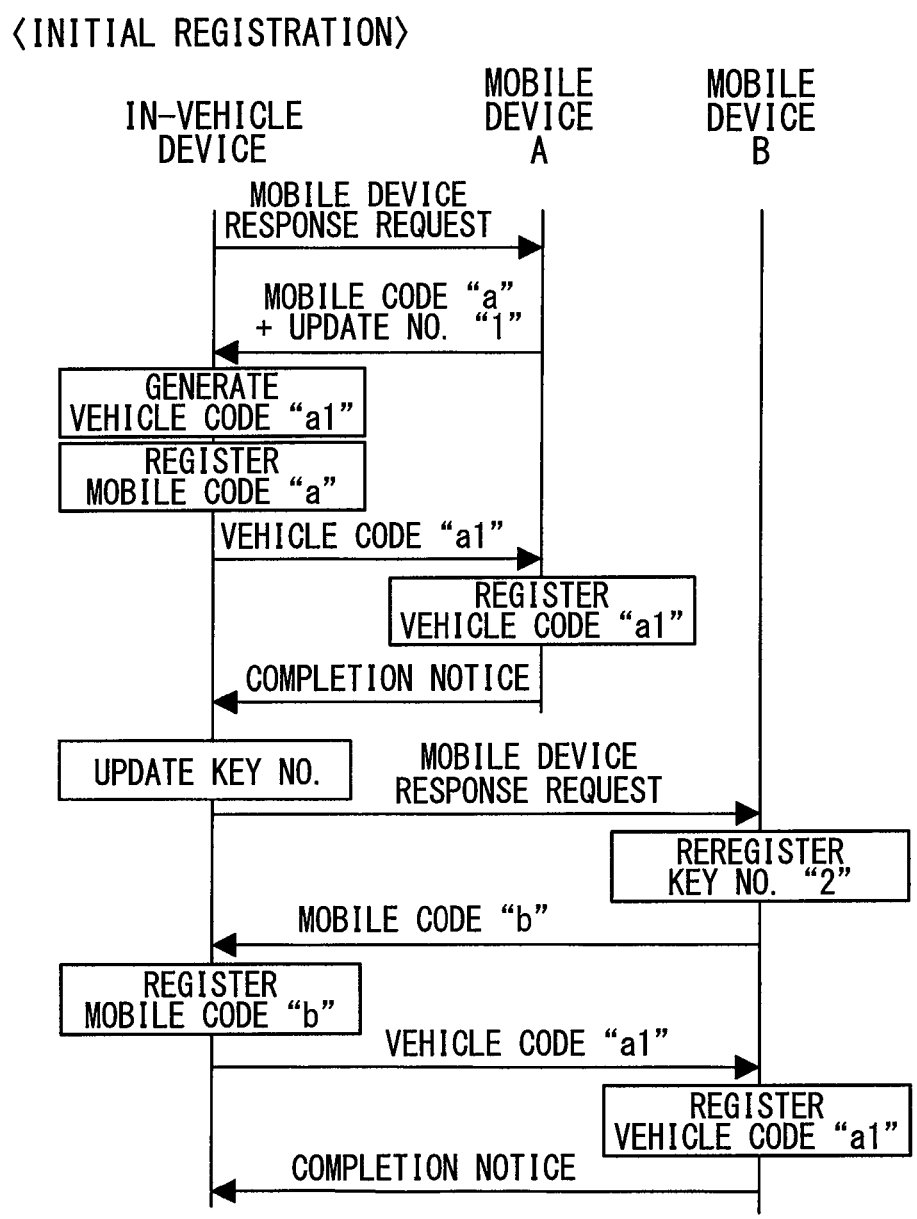
FIG. 10A is a drawing for explaining initial registration according to the second embodiment.

In the initial registration, an operator to execute the information registration processing places the mobile device A in the communication range of the short-range wireless antenna 26. When the IG switch 30 is turned on after a registration command is inputted, the in-vehicle device 10 sets the key number to "1" and transmits a mobile device response request to the mobile device A as shown in FIG. 10A. When the mobile device response request is received, the mobile device A transmits, as a response to the in-vehicle device 10, mobile device code "a" allocated to the mobile device A itself and update number "1" managed in the mobile device A.

When the mobile device code "a" and the update number "1" are received, the in-vehicle device 10 generates vehicle code "a1" by attaching the update number "1" to the mobile device code "a" and stores (registers) the vehicle code "a1" in the storage device 34. Furthermore, the in-vehicle device 10 registers the mobile device code "a" received from the mobile device A in association with the newly generated vehicle code "a1" and transmits the vehicle code "a1" to the mobile device A.

When the vehicle code "a1" is received, the mobile device A registers the vehicle code "a1" in association with the key number "1" and, upon completion of the registration, transmits a completion notification to the in-vehicle device 10.

When the completion notification is received from the mobile device A, the in-vehicle device 10 updates the key number managed by the in-vehicle device 10 itself to "2," then proceeds to execute registration processing for a mobile device B.

To register information in the mobile device B, the operator executing the information registration processing places the mobile device B, replacing the mobile device A, in the communication range of the short-range wireless antenna 26. Subsequently, when the IG switch 30 is turned on, the in-vehicle device 10 transmits a mobile device response request to the mobile device B. When the mobile device response request is received, the mobile device B registers the key number "2" and transmits, as a response to the in-vehicle device 10, the mobile device code "b" allocated to the mobile device B itself.

When the mobile device code "b" is received, the in-vehicle device 10 registers the mobile device code "b" in association with the vehicle code "a1" stored in the storage device 34 and, at the same time, transmits the vehicle code "a1" to the mobile device B. When the vehicle code "a1" is received, the mobile device B registers the vehicle code "a1" in association with the key number "2" and transmits a completion notification.

When the completion notification is received from the mobile device B, the in-vehicle device 10 terminates the information registration processing including the initial registration.

In this way, the vehicle code "a1" and the mobile device code of each mobile device 50 are registered in the in-vehicle device 10. On the other hand, in the mobile device A, the vehicle code "a1" is registered along with the key number (i.e. "1") representing the response timing for the mobile device A, whereas, in the mobile device B, the vehicle code "a1" is registered along with the key number (i.e. "2") representing the response timing for the mobile device B.

Figure 10B:
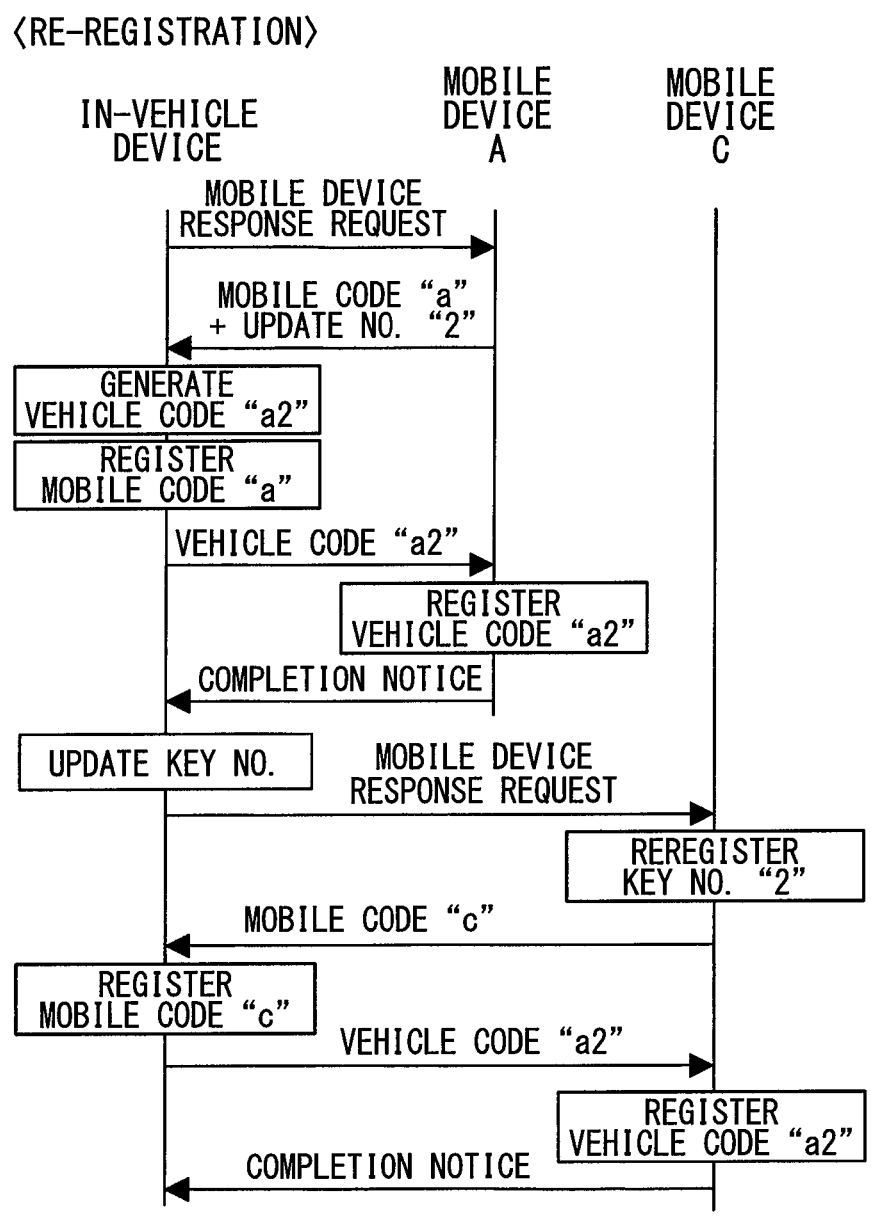
FIG. 10B is a drawing for explaining re-registration according to the second embodiment.

In the re-registration, too, an operator to execute the information registration processing places the mobile device A in the communication range of the short-range wireless antenna 26. When the IG switch 30 is turned on after a registration command is inputted, the in-vehicle device 10 sets the key number to "1" and transmits a mobile device response request as shown in FIG. 10B. When the mobile device response request is received, the mobile device A updates the update number managed by itself from "1" to "2" and transmits, as a response to the in-vehicle device 10, the update number "2" and the mobile device code "a" allocated to the mobile device A itself.

When the mobile device code "a" and the update number "2" are received, the in-vehicle device 10 generates a new vehicle code "a2" by attaching the update number "2" to the mobile device code "a." Subsequently, the in-vehicle device 10 registers the mobile device code "a" in association with the newly generated vehicle code "a2" and transmits the vehicle code "a2" to the mobile device A. This changes the vehicle code registered in the storage device 34 from "a1" to "a2."

When the vehicle code "a2" is received, the mobile device A registers the vehicle code "a2" in association with the key number "1" and, upon completion of the registration, transmits a completion notification to the in-vehicle device 10.

When the completion notification is received from the mobile device A, the in-vehicle device 10 updates the key number managed by itself to "2" and proceeds to register information in the mobile device C.

To register information in the mobile device C, the operator executing the information registration processing places the mobile device C, replacing the mobile device A, in the communication range of the short-range wireless antenna 26. When the IG switch 30 is subsequently turned on, the in-vehicle device 10 transmits a mobile device response request to the mobile device C. When the mobile device response request is received, the mobile device C registers the key number "2" and transmits, as a response to the in-vehicle device 10, the mobile device code "c" allocated to the mobile device C itself.

When the mobile device code "c" is received, the in-vehicle device 10 registers the mobile device code "c" in association with the vehicle code "a2" stored in the storage device 34 and, at the same time, transmits the vehicle code "a2" to the mobile device C. When the vehicle code "a2" is received, the mobile device C registers the vehicle code "a2" in association with the key number "2" and transmits a completion notification.

When the completion notification is received from the mobile device C, the in-vehicle device 10 terminates the in-vehicle registration processing including the re-registration.

In this way, the new vehicle code "a2" and the mobile device code of each mobile device 50 are registered in the in-vehicle device 10. On the other hand, in the mobile device A, the vehicle code "a2" is registered along with the key number (i.e. "1") representing the response timing for the mobile device A, whereas, in the mobile device C, the vehicle code "a2" is registered along with the key number (i.e. "2") representing the response timing for the mobile device C.

Figure 11:
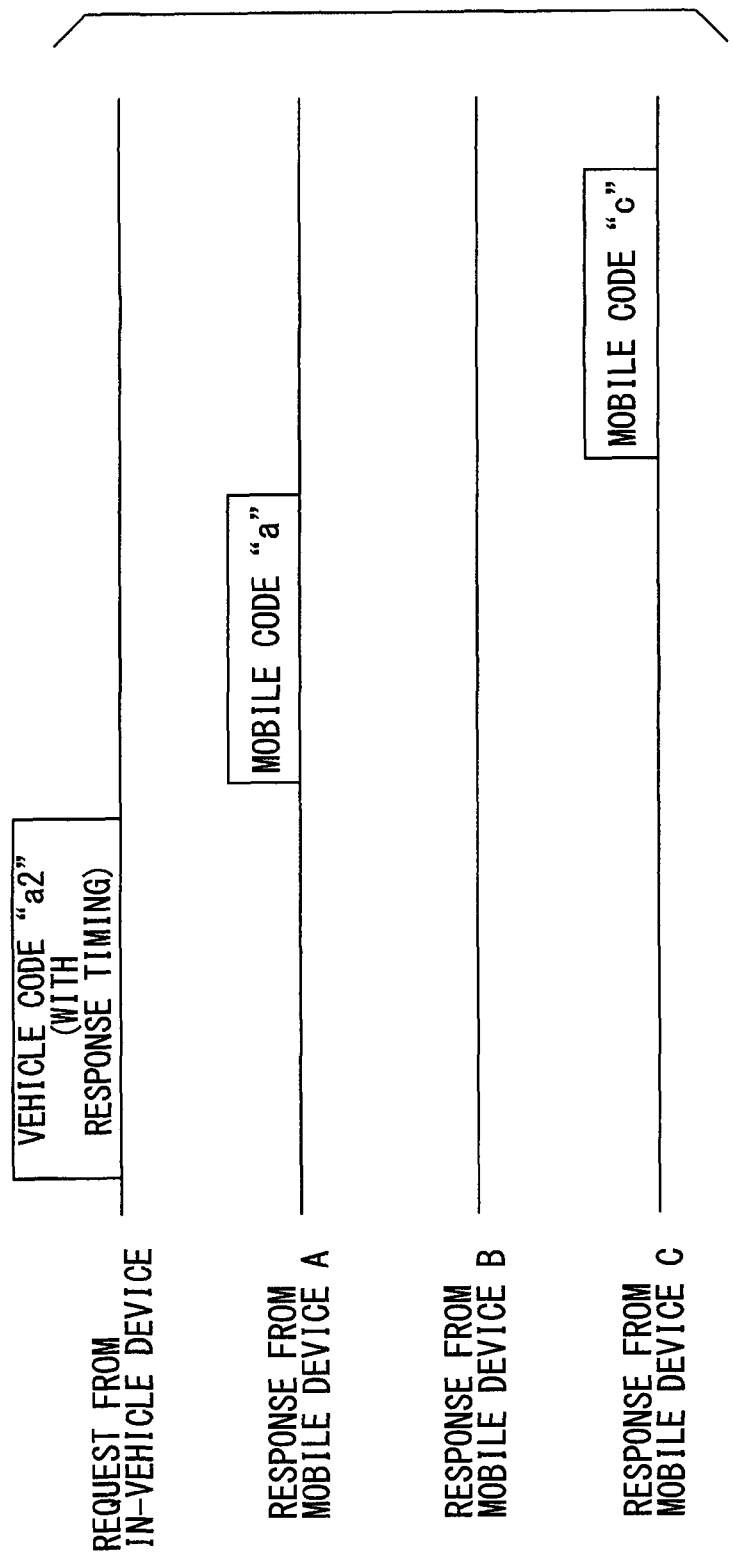
FIG. 11 is a drawing for explaining technical effects of an electronic key system according to the second embodiment.

When the authentication processing is executed in the electronic key system 1 in which the re-registration processing has been executed as described above, first, the in-vehicle device 10 transmits a response request including the vehicle code "a2" and response timing as shown in FIG. 11. When the response request is received, each of the mobile devices A and C transmits the mobile device code allocated to itself at the response timing (i.e. the key number) registered in itself.

In the present embodiment, when a mobile device 50 receives a response request in the authentication processing, the mobile device 50 determines whether the vehicle code stored in the mobile device 50 matches the received vehicle code. When the two vehicle codes match, the mobile device 50 transmits the mobile device code allocated to the mobile device 50 itself at the response timing (key number) registered in the mobile device 50. When the two vehicle codes do not match or when no vehicle code is stored in the mobile device 50, the mobile device 50 transmits no mobile device code.

Technical Effects of the Second Embodiment

As described above and as shown in FIG. 11, in the electronic key system 1 of the present embodiment, no mobile device code is transmitted as a response from the mobile device B, and coincidence can be prevented between response timings for mobile device code transmission by the mobile devices A and C.

Thus, the electronic key system 1 of the present embodiment can provide technical effects similar to those generated by the electronic key system 1 of the first embodiment.

Modification Example of the Second Embodiment

The second embodiment of the present disclosure has been described above. The embodiment, however, is not limited to the above configuration, and it can be modified in various ways without departing from the scope of this disclosure.

For example, even though, in the information registration processing, the update numbers are managed in respective mobile devices 50, the update numbers may be updated in the in-vehicle device 10. In such a case, the in-vehicle registration processing can be executed using the procedure shown in FIG. 12.

Figure 12:
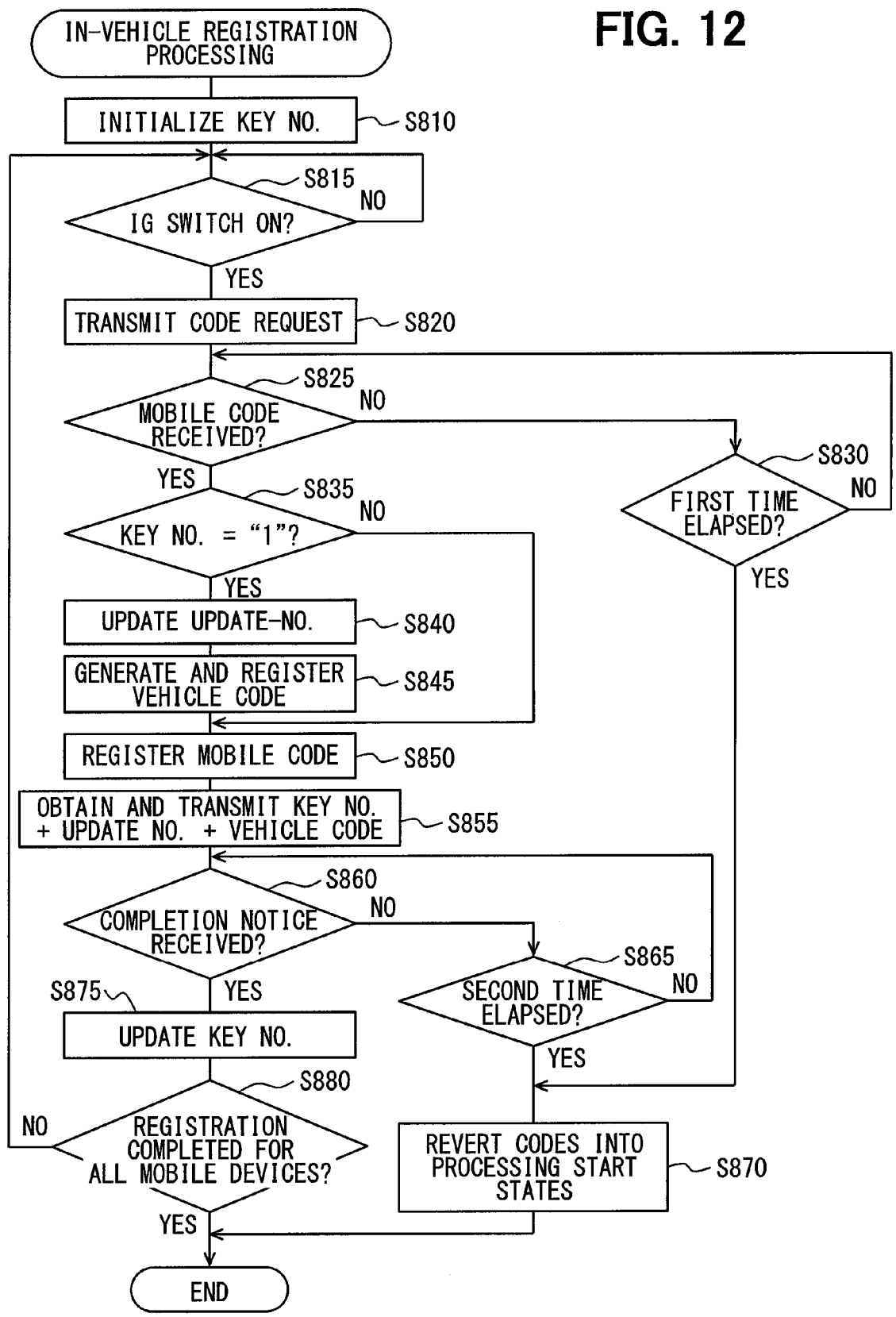
FIG. 12 is a flowchart showing a procedure of a modification example of in-vehicle registration processing according to the second embodiment.

To be concrete, when the in-vehicle registration processing shown in FIG. 12 is started, the key number ("KEY NO." in FIG. 12) is initialized (S810), then it is determined (S815) whether the IG switch 30 has been turned on. When the IG switch 30 has not been turned on (S815: NO), turning on of the IG switch 30 is awaited. When the IG switch 30 is turned on (S815: YES), a code request is transmitted via the short-range wireless antenna 26 (S820).

Subsequently, it is determined (S825) whether a mobile device code and an update number ("UPDATE NO." in FIG. 12) have been received from the mobile device 50 via the short-range wireless antenna 26. When it is determined that no mobile device code and no update number have been received (S825: NO), it is determined (S830) whether the first predetermined amount of time has elapsed after transmission of the code request in S820. When, in S830, it is determined that the first predetermined amount of time has elapsed (S830: YES), processing advances to S870 being described in detail later. When it is determined that the first predetermined amount of time has not elapsed (S830: NO), processing returns to S825.

When, in S825, it is determined that a mobile device code and an update number have been received (S825: YES), it is determined (S835) whether the current key number is "1". When, in S835, it is determined that the key number is "1" (S835: YES), the update number is incremented by one (S840), and a vehicle code is generated and registered in the storage device 34 (S845). Processing then advances to S850. The vehicle code is generated and registered as in the second embodiment.

When, in S835, it is determined that the key number is not "1" (S835: NO), processing advances to S850 without executing S840 and S845.

In S850, the mobile device code received in S825 is stored for registration in the storage device 34 in association with the registrant identification information. Subsequently, the current key number, update number and vehicle code are obtained. The current key number, update number and vehicle code (corresponding to an example of the control device code of the present disclosure) obtained are transmitted via the short-range wireless antenna 26 (S855).

Then, it is determined (S860) whether a completion notification has been received via the short-range wireless antenna 26. When no completion notification has been received (S860: NO), it is determined (S865) whether the second predetermined amount of time has elapsed after transmission of the control device code in S855. When it is determined that the second predetermined amount of time has elapsed (S865: YES), processing advances to S870.

In S870, various information corresponding to the current key number is reverted into the information that was in a registered state when the in-vehicle registration processing was started. The in-vehicle registration processing is then terminated.

When, in S865, it is determined that the second predetermined amount of time has not elapsed (S830: NO), processing returns to S860. When, in S860, it is determined that a completion notification has been received (S860: YES), the key number is incremented by one (S875).

Subsequently, it is determined whether information registration has been completed for all mobile devices 50 equaling the number of registration requests (S880). When information registration has not been completed for all mobile devices 50 equaling the number of registration requests (S880: NO), processing returns to S815. On the other hand, when information registration has been completed for all mobile devices 50 equaling the number of registration requests (S880: YES), the in-vehicle registration processing is terminated.

Figure 13:
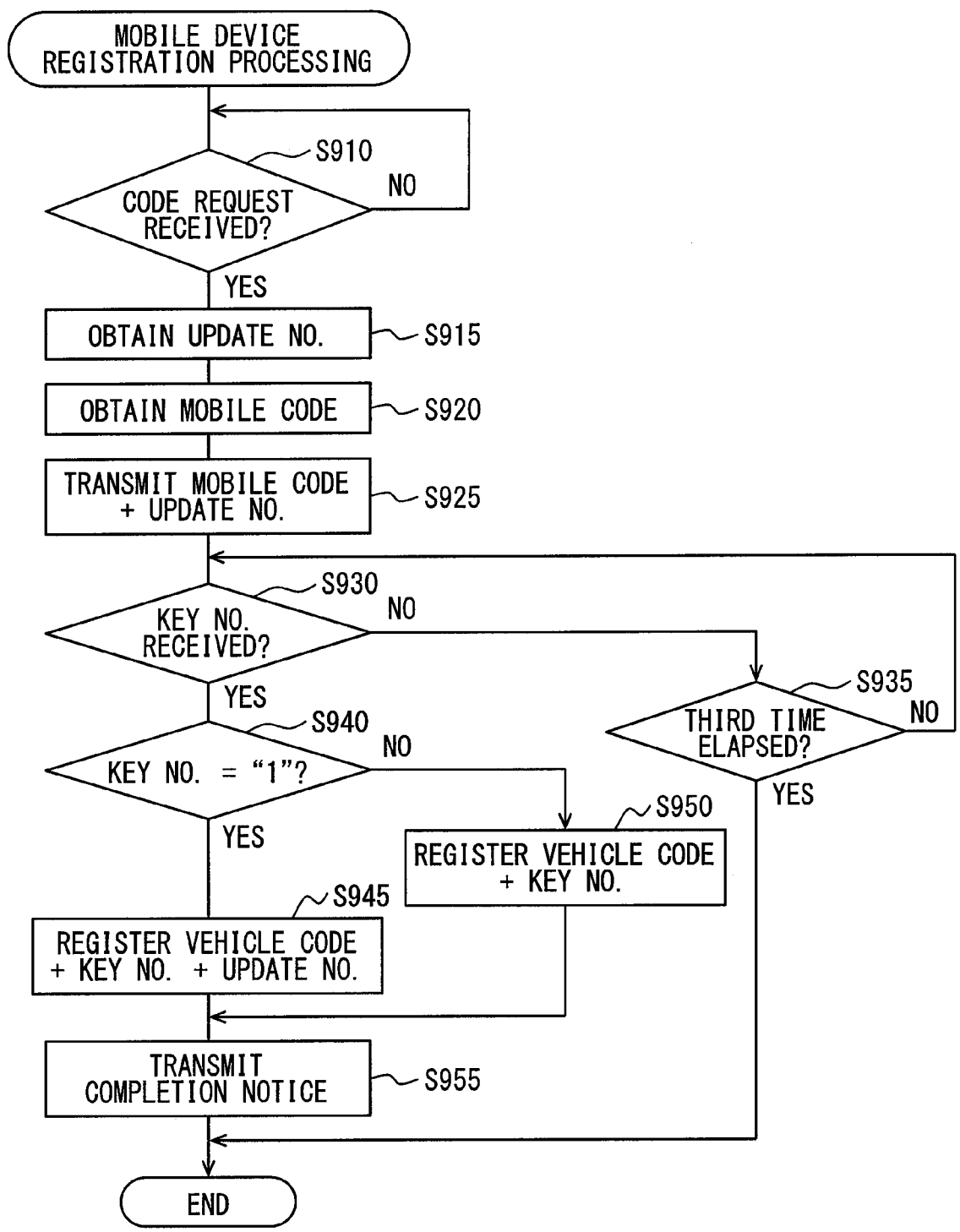
FIG. 13 is a flowchart showing a procedure of a modification example of mobile device registration processing according to the second embodiment.

In cases where the in-vehicle registration processing procedure as shown in FIG. 12 is used, it is necessary to execute the mobile device registration processing using the procedure as shown in FIG. 13.

Namely, when the mobile device registration processing procedure shown in FIG. 13 is started, first, it is determined (S910) whether a code request from the in-vehicle device 10 has been received via the short-range wireless communication unit 60. When, in S910, it is determined that no code request has been received (S910: NO), reception of a code request is awaited. When a code request is received (S910: YES), the update number stored in the storage device 64 is obtained (S915).

Subsequently, the mobile device code allocated to the mobile device 50 itself is obtained (S920), then information including the mobile device code obtained and the update number obtained in S915 is transmitted via the short-range wireless communication unit 60 (S925).

Subsequently, it is determined (S930) whether information including a key number has been received via the short-range wireless communication unit 60. When it is determined that no information including a key number has been received (S930: NO), it is determined (S935) whether the third predetermined amount of time has elapsed after transmission of the mobile device code and the update number in S925. When it is determined that the third predetermined amount of time has elapsed (S935: YES), the mobile device registration processing is terminated. On the other hand, when the third predetermined amount of time has not elapsed (S935: NO), processing returns to S930.

When, in S930, it is determined that information including a key number has been received (S930: YES), it is determined (S940) whether the received key number is "1". When the key number is "1" (S940: YES), the update number and the vehicle code received with the key number in S930 are registered in the storage device 64 (S945) in a mutually associated state. Subsequently, a completion notification is transmitted via the short-range wireless communication unit 60 (S955), and the mobile device registration processing is terminated.

On the other hand, when, in S940, it is determined that the key number is not "1" (S940: NO), the vehicle code received in S930 is registered in the storage device 64 in association with the key number received in S930 (S950). Subsequently, a completion notification is transmitted via the short-range wireless communication unit 60 (S955), and the mobile device registration processing is terminated.

The information registration processing as described above can also provide technical effects similar to those provided by the information registration processing according to the second embodiment. Furthermore, the information registration processing described above makes it unnecessary for each mobile device 50 to manage the update number.

Third Embodiment

An electronic key system according to a third embodiment differs from the electronic key system 1 according to the first and second embodiments mainly in terms of the contents of information registration processing. Therefore, for the third embodiment, configurations and operations identical to those of the first and second embodiments will be denoted by reference symbols identical to those used for the first and second embodiments, and the description of such configurations and operations will be omitted. The following description will, therefore, center on information registration processing, that is, in-vehicle registration processing and mobile device registration processing differing from such processing according to the first and second embodiments.

<In-Vehicle Registration Processing>

The in-vehicle registration processing according to the present embodiment differs from the in-vehicle registration processing according to the first and second embodiments in the manner of vehicle code generation. Namely, in the in-vehicle registration processing according to the present embodiment, a vehicle code is generated by attaching an update number to a vehicle-specific code. The vehicle-specific code is identification information identifying an in-vehicle device 10. Each in-vehicle device 10 has a pre-allocated fixed value (i.e. fixed identification information). Namely, each in-vehicle device 10 has a unique vehicle-specific code allocated to itself.

Figure 14:
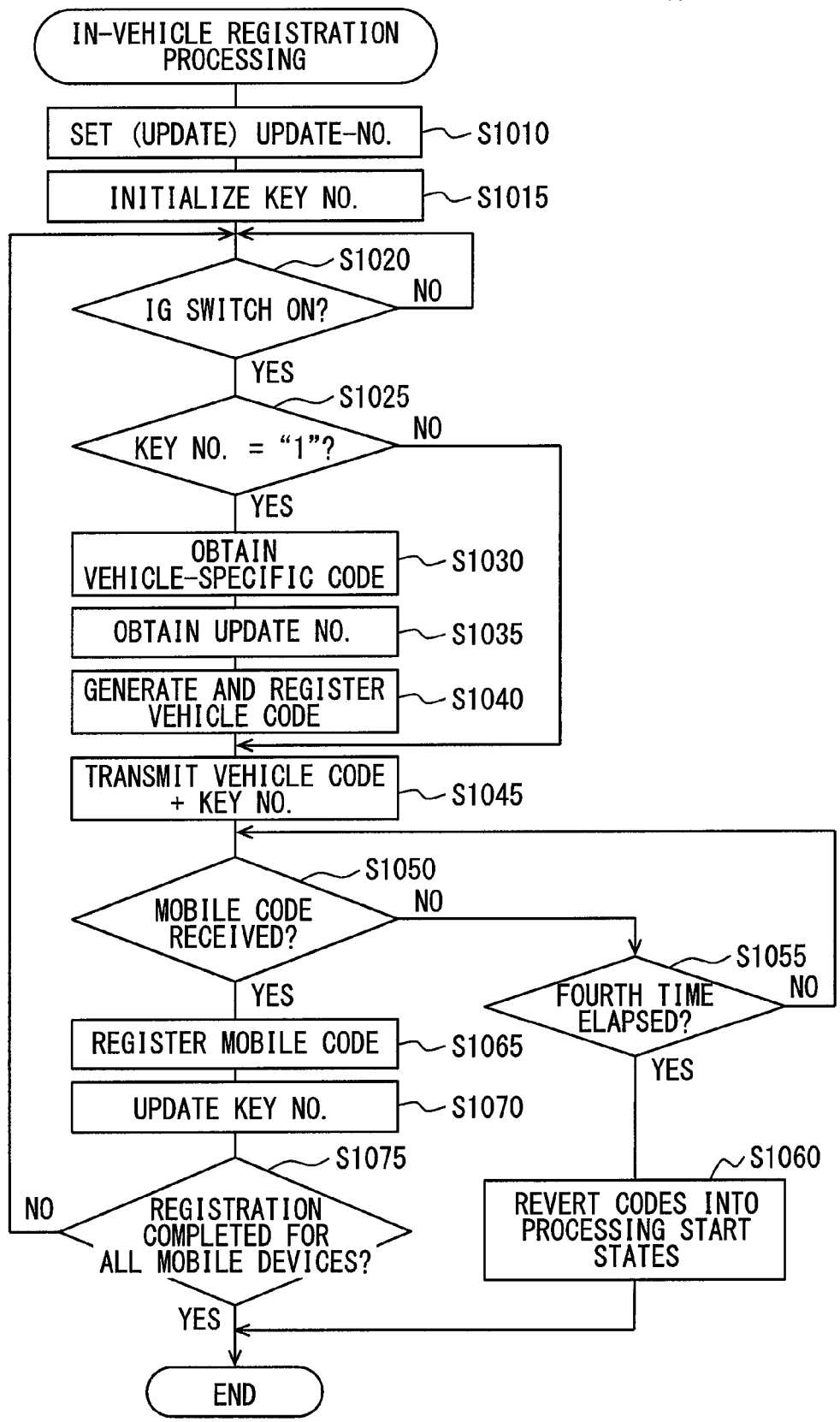
FIG. 14 is a flowchart showing a procedure of in-vehicle registration processing according to a third embodiment.

In concrete terms, the in-vehicle registration processing of the present embodiment is started when a registration command is inputted. Then, as shown in FIG. 14, the update number is incremented by one (S1010), and the key number ("KEY NO." in FIG. 14) is initialized (S1015). In the present embodiment, the initial value of the update number is "0."

Subsequently, it is determined (S1020) whether the IG switch 30 has been turned on. When the IG switch 30 has not been turned on (S1020: NO), turning on of the IG switch 30 is awaited. When the IG switch 30 is turned on (S1020: YES), it is determined (S1025) whether the current key number is "1". When, in S1025, it is determined that the key number is "1" (S1025: YES), a vehicle-specific code is obtained (S1030), then an update number is obtained (S1035).

Furthermore, a vehicle code is generated by attaching the update number obtained in S1035 to the vehicle-specific code obtained in S1030, and the generated vehicle code is registered in the storage device 34 (S1040). Processing then advances to S1045. The newly generated vehicle code is registered in the storage device 34 as registrant identification information.

When, in S1025, it is determined that the key number is not "1" (S1025: NO), processing advances to S1045 without executing S1030 to S1040.

In S1045, information (corresponding to an example of the device code of the present disclosure) including the vehicle code registered in the storage device 34 as registrant identification information and the current key number is transmitted via the short-range wireless antenna 26. Subsequently, it is determined (S1050) whether a mobile device code has been received from the mobile device 50 via the short-range wireless antenna 26.

When, in S1050, it is determined that no mobile device code has been received (S1050: NO), it is determined (S1055) whether a fourth predetermined amount of time has elapsed after transmission in S1045 of the information including the vehicle code and the key number. When it is determined that the fourth predetermined amount of time has elapsed (S1055: YES), various information corresponding to the current key number is reverted into the information that was in a registered state when the in-vehicle registration processing was started (S1060). Namely, S1060 serves as a restoration unit (means) to revert the registration about the mobile device 50 to which the mobile device response request was transmitted to the previous state that existed before the mobile device code from the mobile device 50 was received.

Subsequently, the in-vehicle registration processing is terminated.

When it is determined that the fourth prescribed amount of time has not elapsed (S1055: NO), processing returns to S1050. When, in S1050, it is determined that a mobile device code has been received (S1050: YES), the received mobile device code is registered in the storage device 34 in association with the registrant identification information (S1065), and the key number is incremented by one (S1070).

Subsequently, it is determined whether information registration has been completed for all mobile devices 50 equaling the number of registration requests (S1075). When information registration has not been completed for all mobile devices 50 equaling the number of registration requests (S1075: NO), processing returns to S1020. On the other hand, when it is determined that information registration has been completed for all mobile devices 50 equaling the number of registration requests (S1075: YES), the in-vehicle registration processing is terminated.

Namely, in the in-vehicle registration processing of the present embodiment, a new vehicle code is generated by attaching an update number to a vehicle-specific code, and the new vehicle code is registered as registrant identification information. Also in the in-vehicle registration processing of the present embodiment, the mobile device code received from each mobile device 50 is registered in association with the registrant identification information. The newly generated vehicle code is transmitted to each mobile device 50.

<Mobile Device Registration Processing>

Figure 15:
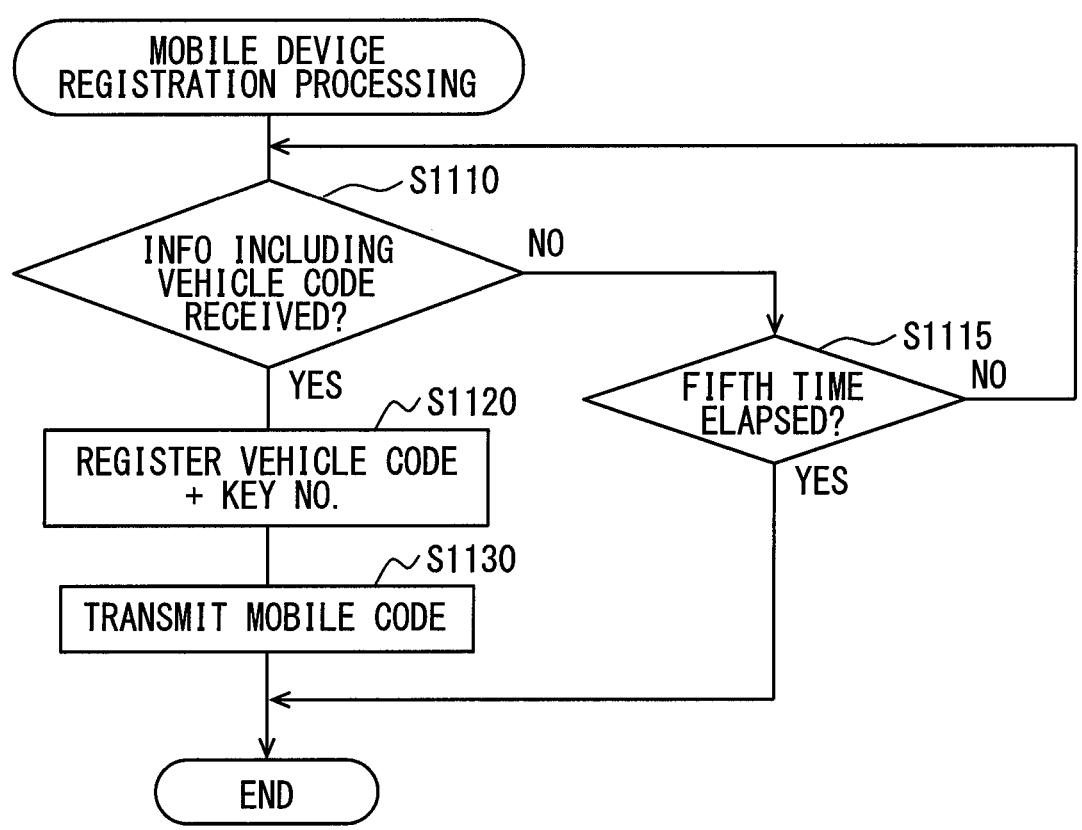
FIG. 15 is a flowchart showing a procedure of mobile device registration processing according to the third embodiment.

As shown in FIG. 15, when the mobile device registration processing according to the present embodiment is started, it is determined (S1110) whether information including the vehicle code registered in the in-vehicle device 10 as registrant identification information and the current key number (i.e. a device code) has been received via the short-range wireless communication unit 60. When no information including the in-vehicle device code has been received (S1110: NO), it is determined (S1115) whether a fifth predetermined amount of time has elapsed after starting of the mobile device registration processing.

When, in S1115, it is determined that the fifth predetermined amount of time has elapsed (S1115: YES), the mobile device registration processing is terminated. When it is determined that the fifth predetermined amount of time has not elapsed (S1115: NO), processing returns to S1110. When, in S1110, it is determined that the information including the vehicle code has been received (S1110: YES), the received vehicle code and the key number are registered in the storage device 64 in a mutually associated state (S1120). Subsequently, the mobile device code allocated to the mobile device 50 itself is obtained and transmitted via the short-range wireless communication unit 60 (S1130). The mobile device registration processing is then terminated.

<Execution Examples of Information Registration Processing>

In the following, initial registration and re-registration will be described as execution examples of the information registration processing according to the present embodiment.

Figure 16A:
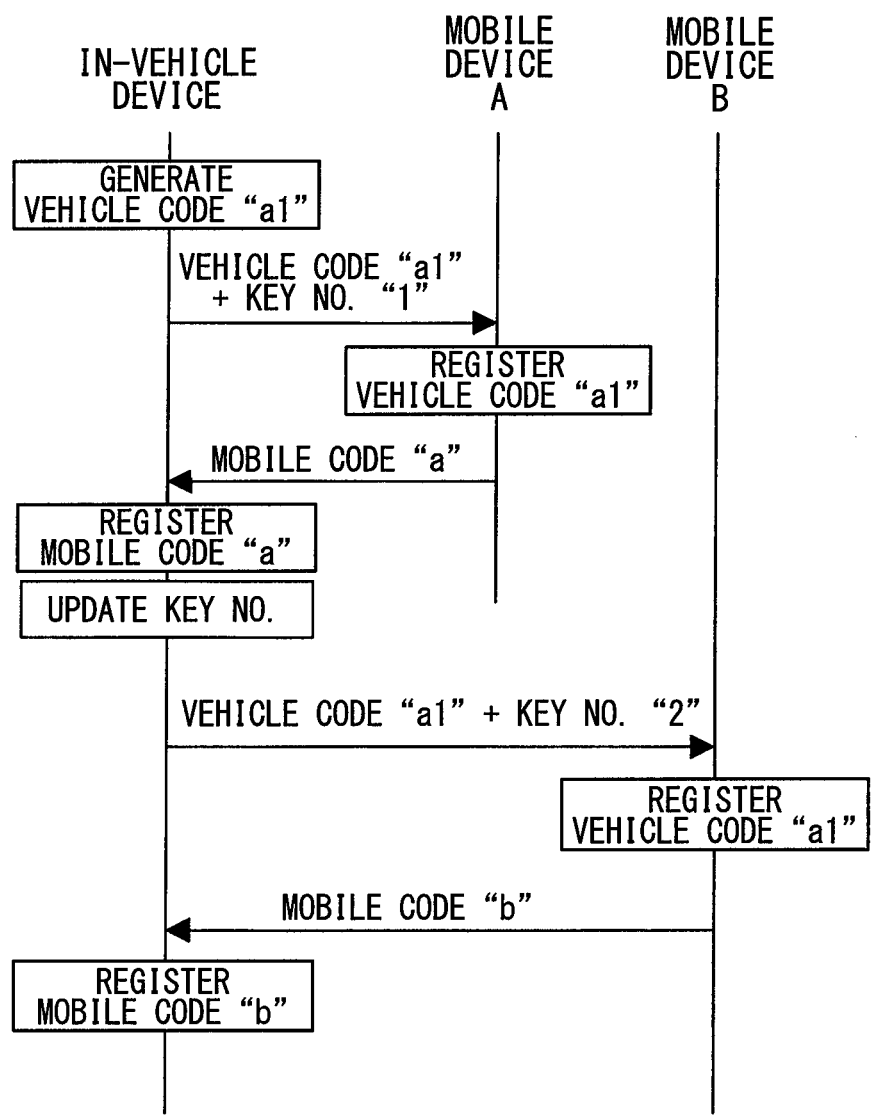
FIG. 16A is a drawing for explaining initial registration according to the third embodiment.

In the initial registration, an operator to execute the information registration processing places a mobile device A in the communication range of the short-range wireless antenna 26. When the IG switch 30 is turned on after a registration command is inputted, the in-vehicle device 10 sets the update number to "1" and the key number to "1." Also, as shown in FIG. 16A, the in-vehicle device 10 generates vehicle code "a1" by attaching the update number "1" to the vehicle-specific code "a" and stores (registers) the vehicle code "a1" in the storage device 34.

Subsequently, the in-vehicle device 10 transmits information including the registered vehicle code "a1" and key number "1" as a mobile device response request to the mobile device A. When the vehicle code "a1" and the key number "1" are received, the mobile device A registers the vehicle code "a1" in association with the key number "1," then transmits in response the mobile device code "a" assigned to the mobile device A itself.

When the mobile device code "a" is received, the in-vehicle device 10 registers the mobile device code "a" in association with the vehicle code "a1" stored in the storage device 34 while updating the key number from "1" to "2." Processing then proceeds to execute registration for the next mobile device B. Namely, in the present embodiment, the mobile device code transmitted as a response from a mobile device 50 plays a role of a completion notification.

To register information in the mobile device B, the operator executing the information registration processing places the mobile device B, replacing the mobile device A, in the communication range of the short-range wireless antenna 26. Subsequently, when the IG switch 30 is turned on, the in-vehicle device 10 transmits information including the registered vehicle code "a1" and key number "2" as a mobile device response request to the mobile device B. When the vehicle code "a1" and the key number "2" are received, the mobile device B registers the vehicle code "a1" in association with the key number "2," then transmits in response the mobile device code "b" assigned to the mobile device B itself.

When the mobile device code "b" is received, the in-vehicle device 10 registers the mobile device code "b" in association with the vehicle code "a1" stored in the storage device 34.

Subsequently, the in-vehicle device 10 terminates the information registration processing including the initial registration. As a result, the vehicle code "a1" and the mobile device code of each mobile device 50 are registered in the in-vehicle device 10. On the other hand, in the mobile device A, the vehicle code "a1" is registered along with the key number (i.e. "1") representing the response timing for the mobile device A, whereas, in the mobile device B, the vehicle code "a1" is registered along with the key number (i.e. "2") representing the response timing for the mobile device B.

Figure 16B:
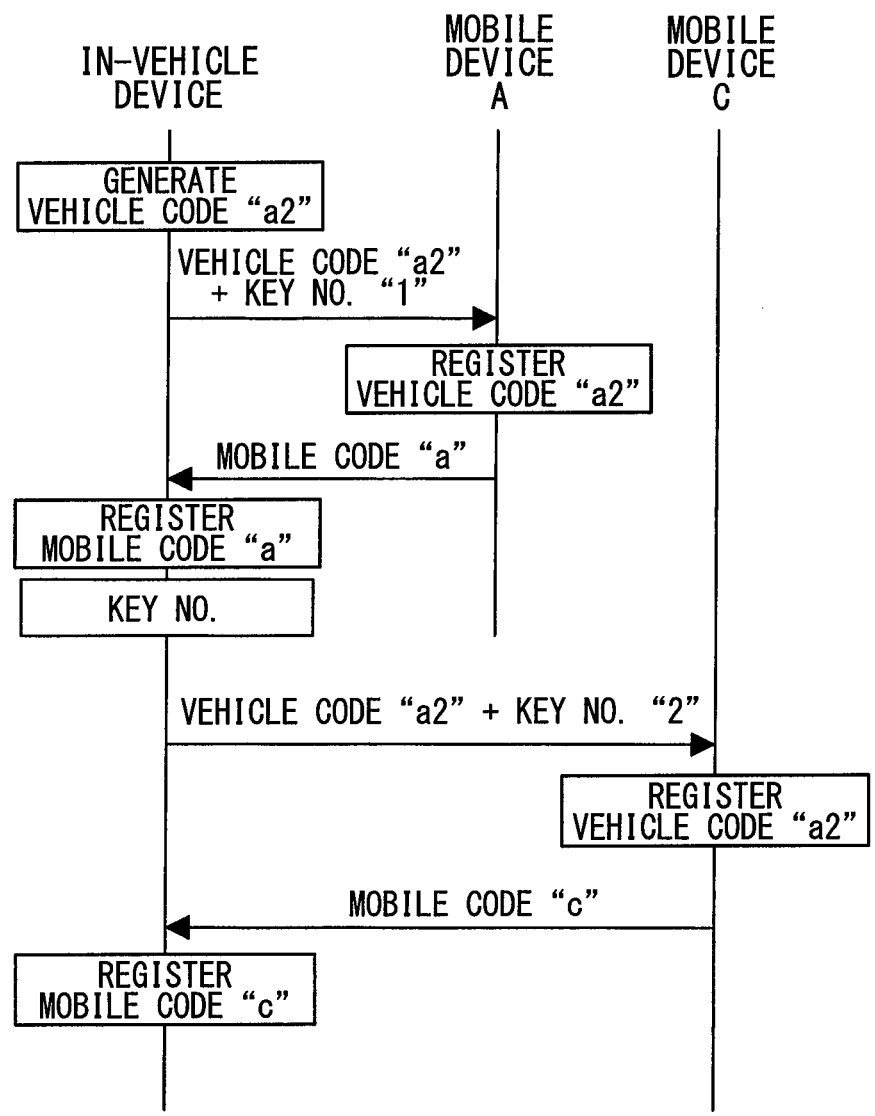
FIG. 16B is a drawing for explaining re-registration according to the third embodiment.

In the re-registration, too, an operator to execute the information registration processing places the mobile device A in the communication range of the short-range wireless antenna 26. When the IG switch 30 is turned on after a registration command is inputted, the in-vehicle device 10 sets the update number to "2" and the key number to "1" as shown in FIG. 16B. Furthermore, the in-vehicle device 10 generates a new vehicle code "a2" by attaching the update number "2" to the vehicle-specific code "a" and stores (registers) the vehicle code "a2" in the storage device 34. This changes the vehicle code (registrant identification information) registered in the storage device 34 from "a1" to "a2."

Subsequently, the in-vehicle device 10 transmits the registered vehicle code "a2" and key number "1" to the mobile device A as a mobile device response request. When the vehicle code "a2" and the key number "1" are received, the mobile device A registers the vehicle code "a2" in association with the key number "1." In this way, the vehicle code registered in the mobile device A is changed from "a1" to "a2."

Subsequently, the mobile device A transmits in response the mobile device code "a" allocated to the mobile device A itself. When the mobile device code "a" is received, the in-vehicle device 10 registers the mobile device code "a" in association with the vehicle code "a1" stored in the storage device 34, while updating the key number from "1" to "2." Processing then proceeds to registration for the mobile device C.

To register information in the mobile device C, the operator executing the information registration processing places the mobile device C, replacing the mobile device A, in the communication range of the short-range wireless antenna 26. When the IG switch 30 is subsequently turned on, the in-vehicle device 10 transmits the registered vehicle code "a2" and the key number "2" as a mobile device response request to the mobile device C. When the vehicle code "a2" and key number "2" are received, the mobile device C registers the vehicle code "a2" in association with the key number "2" and transmits in response the mobile device code "c" allocated to the mobile device C itself.

When the mobile device code "c" is received, the in-vehicle device 10 registers the mobile device code "c" in association with the vehicle code "a2" stored in the storage device 34.

In this way, the in-vehicle device 10 terminates the information registration processing including the re-registration. As a result, the vehicle code "a2" and the mobile device code of each mobile device 50 are registered in the in-vehicle device 10. On the other hand, in the mobile device A, the vehicle code "a2" is registered along with the key number (i.e. "1") representing the response timing for the mobile device A, whereas, in the mobile device C, the vehicle code "a2" is registered along with the key number (i.e. "2") representing the response timing for the mobile device C.

Figure 17:
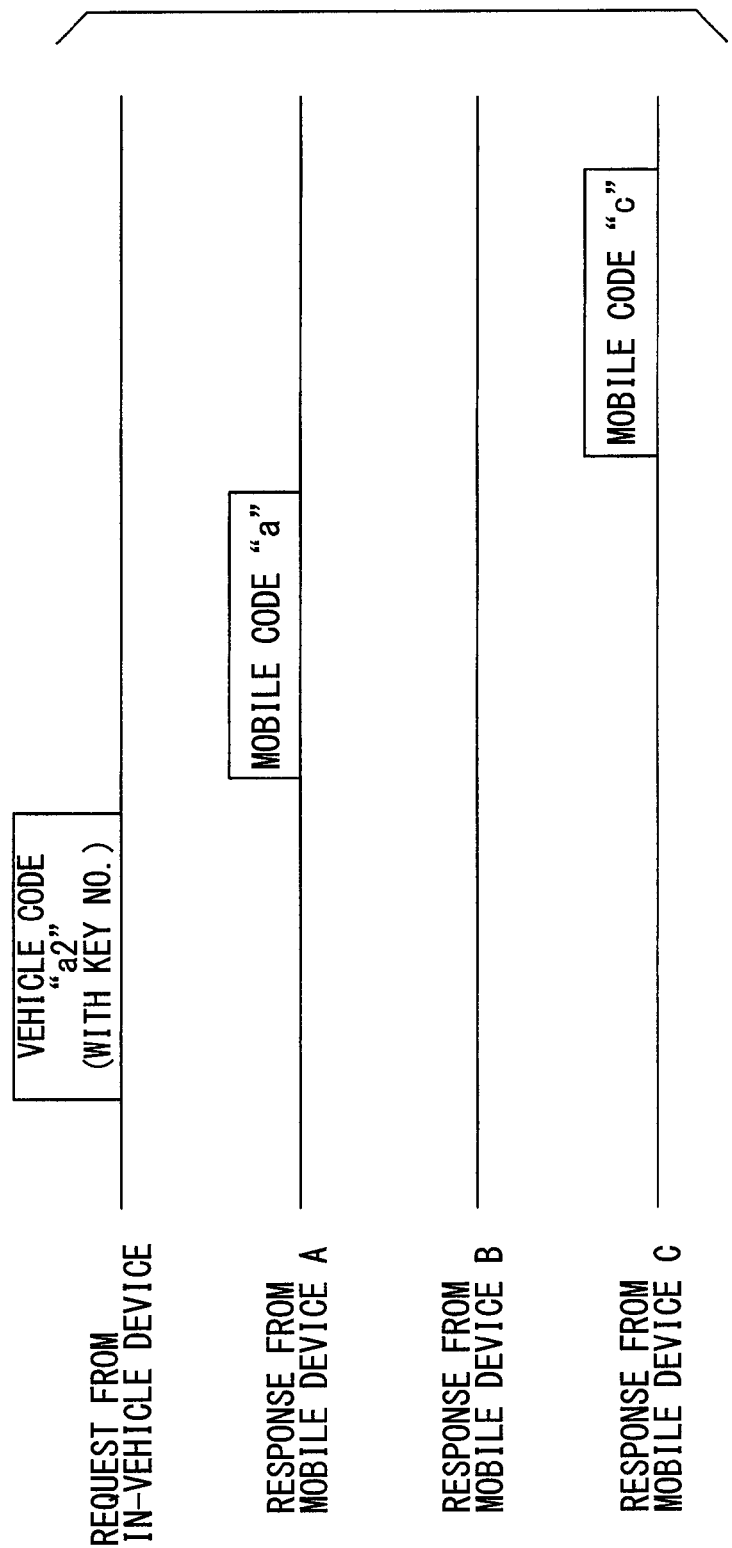
FIG. 17 is a drawing for explaining technical effects of an electronic key system according to the third embodiment.

When the authentication processing is executed in the electronic key system 1 in which the re-registration processing has been executed as described above, first, the in-vehicle device 10 transmits a response request including the vehicle code "a2" and response timing as shown in FIG. 17. When the response request is received, each of the mobile devices A and C transmits the mobile device code allocated to itself at the response timing (i.e. the key number) registered in itself.

In the present embodiment, when a mobile device 50 receives a response request in the authentication processing, the mobile device 50 determines whether the vehicle code stored in the mobile device 50 matches the received vehicle code. When the two vehicle codes match, the mobile device 50 transmits the mobile device code allocated to the mobile device 50 itself at the response timing (key number) registered in the mobile device 50. When the two vehicle codes do not match or when no vehicle code is stored in the mobile device 50, the mobile device 50 transmits no mobile device code.

Technical Effects of the Third Embodiment

As described above, in the electronic key system 1 of the present embodiment, too, coincidence can be prevented between response timings for mobile device code transmission by the mobile devices A and C, and mobile device code transmission by the mobile device B can be prevented. Therefore, according to the electronic key system of the present embodiment, too, technical effects similar to those provided by the first and second embodiments can be provided.

Other Embodiments

Exemplary embodiments of the present disclosure have been described, but the disclosure is not limited to the above exemplary embodiments and various other embodiments are possible without departing from the scope of the disclosure.

For example, even though in the first to third embodiments, the LF transmission unit 14 of the in-vehicle device 10 includes as antennas for signal transmission (hereinafter referred to as "LF antennas") the door antennas 16, in-trunk antenna 18, out-of-trunk antenna 20, and interior antenna 22, the LF antennas included in the in-vehicle device 10 are not limited to the above antennas.

Figure 18:
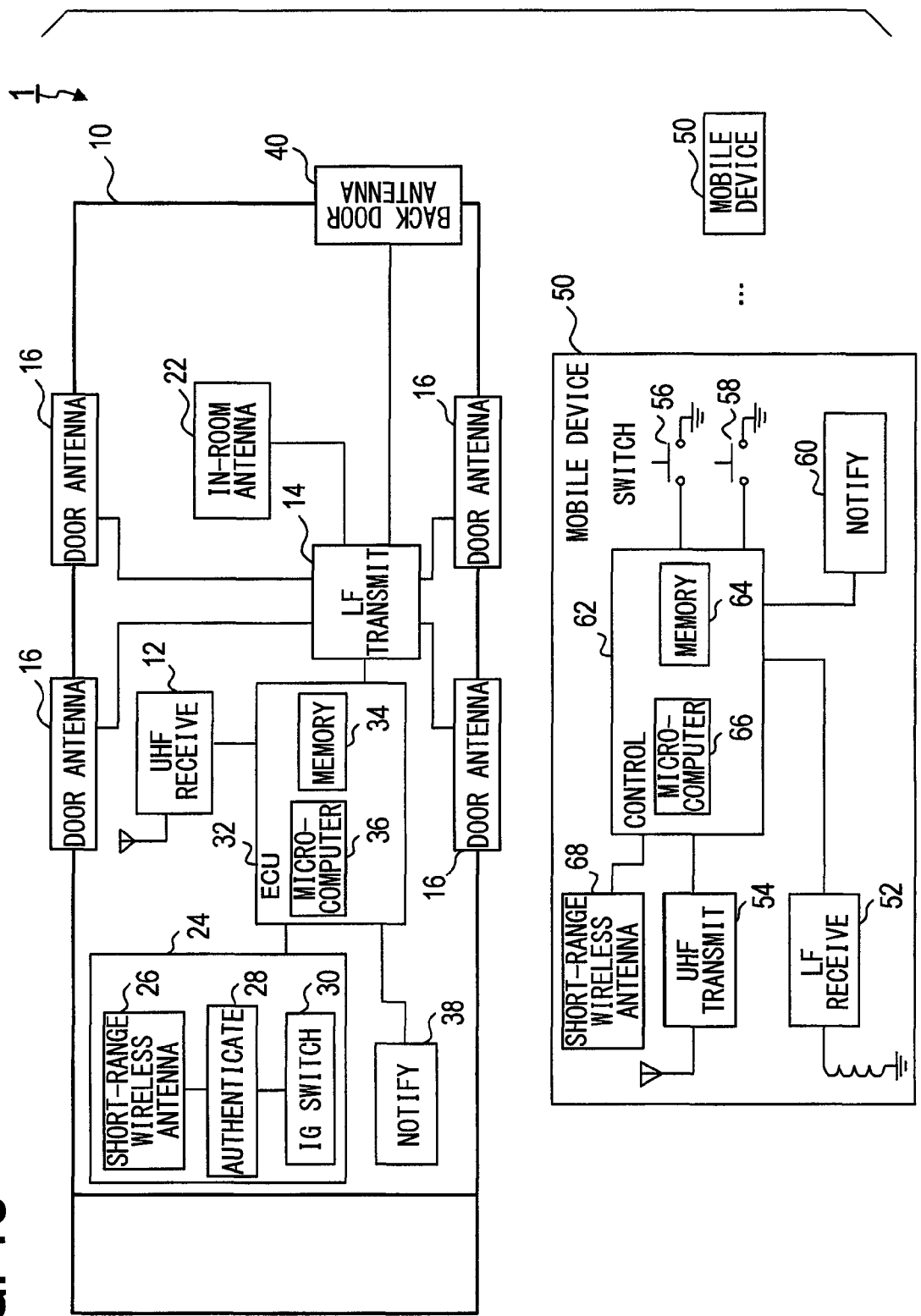
FIG. 18 is a block diagram schematically showing the configuration of a modification example of an electronic key system.
Figure 19:
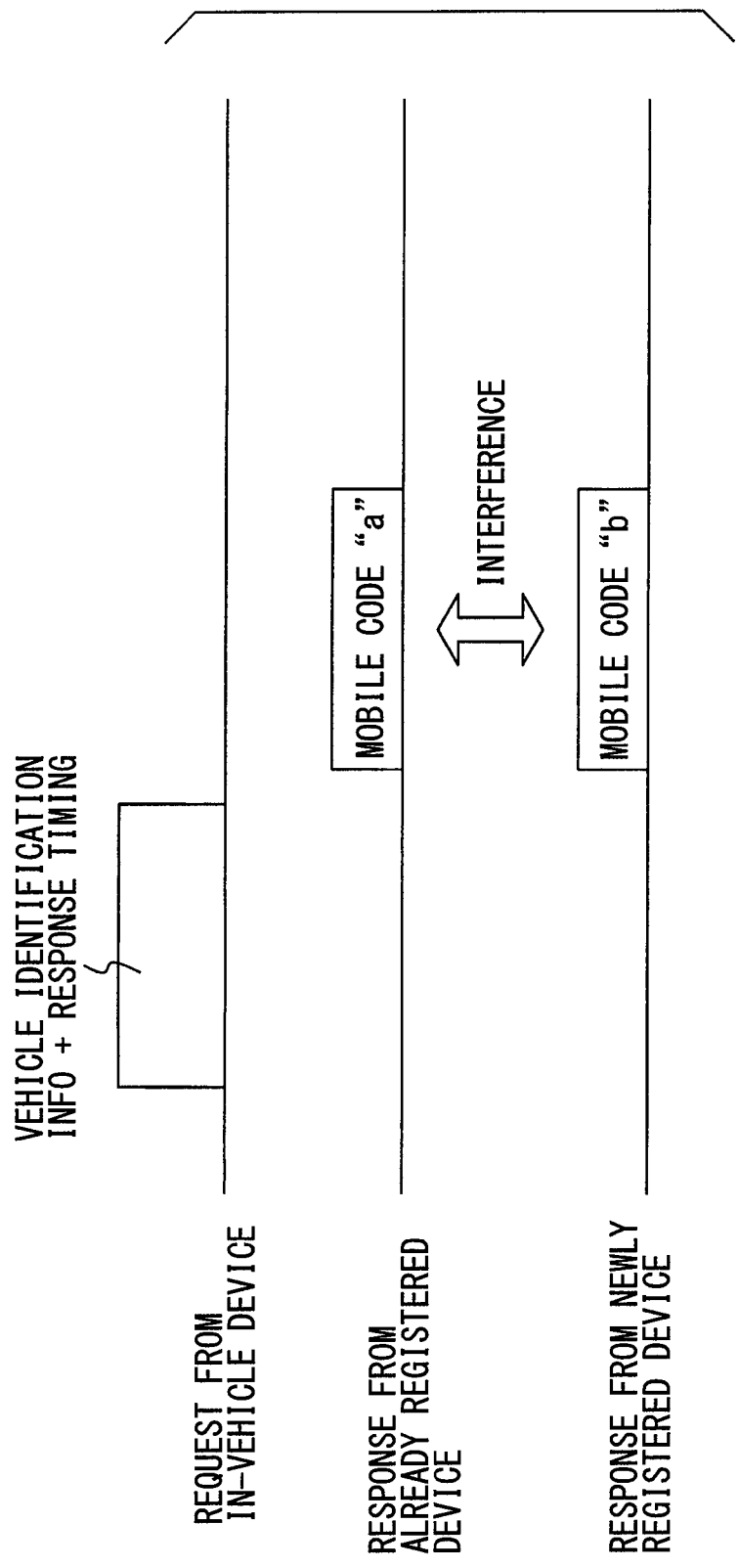
FIG. 19 is a drawing for explaining problems with an existing technique observed by the inventor of the present application.

Namely, the in-vehicle device 10 may include LF antennas appropriate for the type of the vehicle involved. For example, when the vehicle used is a hatchback or a van, the in-vehicle device 10 may be provided with such LF antennas as door antennas 16, an in-trunk antenna 18, an out-of-trunk antenna 20, and back-door antenna 40 as shown in FIG. 18.

The number of the LF antennas is not limited to the above example, either, and it may be determined appropriately.

Also, the electronic key system 1 of each of the first to third embodiments is for use with a vehicle, but the application of the electronic key system of the present disclosure is not limited to a vehicle. The electronic key system of the present disclosure may be applied to keys used in buildings or to other kinds of keys.

In the foregoing embodiments, the in-vehicle device 10 including the electronic control device 32 is an example of a control device. S110 to S180, S310 to S395, S610 to S680, S810 to S880, and S1010 to S1075 provide an example of a registration unit (means). S210 to S240, S510 to S525, S710 to S740, and S910 to S925 provide an example of a code response unit (means). S110 to S120, S310 to S320, S610 to S620, and S810 to S820 provide an example of a code request unit (means). S125, S325, S625, and S825 provide an example of a first code receiving unit (means). S140, S345, S640, and S845 provide an example of an information generation unit (means). S140, S145, S345, S350, S640, S645, S845, and S850 provide an example of a first registration unit (means). S150, S360, S650, and S850 provide an example of a second registration unit (means). S155, S370, S655, and S855 provide an example of a first code transmission unit (means). S175, S390, S675, and S875 provide an example of a timing update unit (means). S225, S260, S550, S725, S755, S945, and S950 provide an example of a third registration unit (means). S265, S555, S760, and S955 provide an example of a first completion transmission unit (means). S170, S385, S670, and S870 provide an example of a restoration unit (means). S340 and S840 provide an example of a first number update unit (means). S220 and S720 provide an example of a second number update unit (means). S1030 provides an example of a fixed value obtaining unit (means). S1035 and S1040 provide an example of an identification information generation unit (means). S1040 provides an example of an information registration unit (means). S1045 provides an example of a second code transmission unit (means). S1070 provides an example of a timing update unit (means). S1110 provides an example of a second code reception unit (means). S1120 provides an example of a fourth registration unit (means). S1065 provides an example of a fifth registration unit. S1130 provides an example of a second completion transmission unit (means). S1060 provides an example of a restoration unit (means).

The present disclosure can provide electronic key systems of various forms.

For example, the electronic key system according to an embodiment of the present disclosure includes at least one mobile device carried by a user and a control device that execute the authentication processing based on a result of executing information communication with the mobile device.

In the electronic key system, the mobile device receives a response request including main identification information (hereinafter referred to as "registrant identification information") registered in the control device and response timing specified for each mobile device. The mobile device compares the registrant identification information and the response timing included in the received response request with the registrant identification information and response timing registered in the mobile device. When the result of the comparison is a match, the mobile device transmits the mobile device code allocated to the mobile device to the control device. The registrant identification information is information to identify the control device. The response timing is information representing timing at which the mobile device is to transmit in response the mobile device code as identification information to identify the mobile device.

In the electronic key system, the control device transmits the response request to the mobile device and executes the authentication processing by comparing the mobile device codes registered in the control device with the mobile device code received from the mobile device as the identification information.

The control device includes a registration unit that executes registration control. In the registration control, every time a registration command is inputted from outside, different main identification information is generated and the generated main identification information is registered in a storage device of the control device in association with the mobile device code of the mobile device for use as the registrant identification information.

In the electronic key system described above, every time registration control is executed, new main identification information can be generated and registered in a storage device of the control device. Therefore, the registrant identification information registered in the storage device is updated to be different from the registrant identification information before being updated.

Assume that, when registering information in a mobile device with no registrant identification information and no response timing registered therein (hereinafter referred to as a "newly registered mobile device") so as to make the mobile device function as an electronic key, main identification information newly generated in the electronic key system of the present disclosure is registered in the newly registered mobile device as the registrant identification information. In this case, the registrant identification information registered in the newly registered mobile device differs from the registrant identification information registered in another mobile device (hereinafter referred to as an "existing registered mobile device) having the registrant identification information and response timing already registered therein.

Thus, the electronic key system described above can reduce the occurrence of a plurality of mobile devices having identical information registered in them.

Furthermore, in the authentication processing executed in the above electronic key system, an existing registered mobile device and a newly registered mobile device are prevented from transmitting their mobile device codes at a same response timing. Therefore, the above electronic key system can reduce interference during the authentication processing, so that the authentication processing failures can be reduced.

Also, the registration unit may generate, as main identification information, information including an update number which represents the number of times the registration control was executed and which is updated every time a registration command is inputted.

In such a configuration, it is possible to generate with higher reliability the main identification information with different content every time registration control is executed.

In the above electronic key system, the mobile device may include a code response unit that, when the mobile device receives from the control device a mobile device response request requesting transmission of a mobile device code, transmits the mobile device code.

In this case, the registration unit of the control device may include a code request unit, a first code reception unit, and an information generation unit. When a registration command is inputted, the code request unit transmits a mobile device response request to the mobile device, and the first code reception unit receives the mobile device code transmitted as a response from the code response unit. The information generation unit attaches the update number to an initially obtained code, thereby generating the main identification information. The initially obtained code is a mobile device code that is temporally first received by the first code reception unit after the input of the registration command. The registration unit registers the generated main identification information in the storage device of the control device, thereby generating the registrant identification information.

The main identification information generated is information including the initially obtained code attached with the update number. The initially obtained code is the mobile device code temporally first received after inputting of the registration command.

Therefore, according to the above electronic key system, out of the information required to generate main identification information, the volume of information to be managed by the control device can be reduced.

Furthermore, the registration unit of the control device may include a first registration unit, a second registration unit, a first code transmission unit, and a timing update unit.

In this case, the first registration unit registers, as the registrant identification information, the main identification information generated by the information generation unit in the storage device of the control device in association with the initially obtained code. The second registration unit registers each later obtained code in the storage device of the control device in association with the registrant identification information. The later obtained code is the mobile device code received by the first code reception unit subsequent to the initially obtained code.

The first code transmission unit transmits a control device code to a target mobile device that is identified from a plurality of the mobile devices based on the mobile device code received by the first code reception unit. The control device code is information including the registrant identification information registered in the first registration unit in association with specific response timing. Every time a control device code is transmitted, the timing update unit updates and specifies the response timing.

In this case, in each mobile device, the third registration unit may register the control device code transmitted from the first code transmission unit.

According to the electronic key system described above, information required to make each mobile device function as an electronic key can be registered in each mobile device with higher reliability, and information required to authenticate each mobile device can be registered in the control device with higher reliability.

An embodiment of the present disclosure may be an information registration system that, every time a registration command is inputted from outside to an electronic key system which includes at least one mobile device and a control device and which executes authentication processing, registers information required for the authentication processing. In this case, the information registration system is required to include a registration unit that newly generates main identification information with different content each time a registration command is inputted, and registers the newly generated main identification information in a storage device of the control device as registrant identification information.

A configuration obtained by omitting a part of the configuration of the above embodiment to extents that achieve the objects of the above embodiment is also an embodiment of the present disclosure. A configuration obtained by appropriately combining the above embodiments and/or modification examples is also an embodiment of the present disclosure. Also, all forms of configurations that are conceivable within the scope of claims are also embodiments of the present disclosure.

Reference symbols used in describing the foregoing embodiments are also used appropriately in claims. The purpose of using such reference symbols in claims is to make the invention defined by claims easier to understand, and such reference symbols are not intended to limit the technical scope of the invention defined by claim.

What is claimed is:

1. An electronic key system comprising:
at least one mobile device carried by a user; and
a control device that executes authentication processing based on a result of information communication with the mobile device, wherein:
main identification information identifying the control device is registered in the control device as registrant identification information;
when the mobile device receives a response request including the registrant identification information and response timing, the mobile device compares the registrant identification information and the response timing which are included in the response request with registrant identification information and response timing which are registered in the mobile device,
the response timing represents a timing specific to the mobile device at which the mobile device is to transmit a response including a mobile device code serving as identification information to identify the mobile device;
when a result of the comparing is a match, the mobile device transmits the mobile device code allocated to the mobile device to the control device;
the control device transmits the response request to the mobile device and executes the authentication processing by comparing a mobile device code registered in the control device with the mobile device code received from the mobile device as the identification information; and
the control device includes a registration unit that executes registration control in which the registration unit newly generates the main identification information with different content each time a registration command is inputted from outside and registers the newly generated main identification information in a storage device of the control device in association with the mobile device code of the mobile device as the registrant identification information.

2. The electronic key system according to claim 1, wherein
the registration unit generates, as the main identification information, information including an update number which represents the number of times the registration control has been executed and which is updated each time the registration command is inputted.

3. The electronic key system according to claim 2, wherein:
the mobile device includes a code response unit that transmits the mobile device code when the mobile device receives from the control device a mobile device response request requesting transmission of the mobile device code;
the registration unit of the control device includes:
a code request unit that transmits the mobile device response request to the mobile device when the registration command is inputted;
a first code reception unit that receives the mobile device code transmitted from the code response unit; and
an information generation unit that generates, as the main identification information, information including an initially obtained code attached with the update number, wherein the initially obtained code is the mobile device code that is temporally first received by the first code reception unit after the input of the registration command; and
the main identification information generated by the information generation unit is registered as the registrant identification information in the storage device of the control device.

4. The electronic key system according to claim 3, wherein
the registration unit of the control device includes:
a first registration unit that registers, as the registrant identification information, the main identification information generated by the information generation unit in the storage device of the control device in association with the initially obtained code;

a second registration unit that registers each later obtained code in the storage device of the control device in association with the registrant identification information, wherein the later obtained codes is the mobile device code that is received by the first code reception unit subsequent to the initially obtained code;

a first code transmission unit that transmits a control device code to a target mobile device that is identified from a plurality of the mobile devices based on the mobile device code received by the first code reception unit, wherein the control device code is information including the registrant identification information registered in the first registration unit in association with specific response timing; and a timing update unit that updates and specifies the response timing each time the control device code is transmitted from the first code transmission unit, and each of the mobile devices includes a third registration unit that registers the control device code transmitted from the first code transmission unit.

5. The electronic key system according to claim 4, wherein
the first code transmission unit sets the target mobile device to each mobile device identified by the later obtained code.

6. The electronic key system according to claim 4, wherein
the first code transmission unit sets the target mobile device to each of the mobile devices identified by the initially obtained code and the later obtained code.

7. The electronic key system according to claim 4, wherein:
each of the mobile devices includes a first completion transmission unit that transmits a completion notification, which indicates completion of the registration, to the control device when the third registration unit completes registering the control device code; and
wherein the control device includes a restoration unit that, in absence of receipt of the completion notification from the first completion transmission unit during elapse of a predetermined amount of time after transmission of the control device code from the first code transmission unit, reverts the information about the target mobile device registered in the storage device of the control device such that the information about the target mobile device to which the control device code was transmitted is reverted to the information about the target mobile device which was registered before the first code reception unit received the mobile device code from the target mobile device.

8. The electronic key system according to claim 2, wherein:
the control device includes a first number update unit that updates the update number each time the registration command is inputted; and
the control device generates information including the update number updated by the first number update unit as the main identification information.

9. The electronic key system according to claim 2, wherein:
each of the mobile devices includes a second number update unit that updates the update number each time the registration command is inputted;
the code response unit transmits, as a response, the update number updated by the second number update unit along with the mobile device code; and the registration unit of the control device generates, as the main identification information, information including the update number transmitted as the response from the code response unit, and registers the information in the storage device of the control device as the registrant identification information.

10. The electronic key system according to claim 2, wherein the identification information to identify the control device is provided as fixed identification information that is a pre-specified fixed value;
wherein the registration unit includes:
a fixed value obtaining unit that obtains the fixed identification information when the registration command is inputted;
an identification information generation unit that generates, as the main identification information, information including the fixed identification information obtained by the fixed value obtaining unit and attached with the update number;
an information registration unit that registers the main identification information generated by the identification information generation unit in the storage device of the control device as the registrant identification information;
a second code transmission unit that transmits a device code to one of the mobile devices, the device code being information including the registrant identification information registered in the storage device by the information registration unit and specific response timing associated with the registrant identification information; and
a timing update unit that updates and specifies the response timing each time the device code is transmitted from the second code transmission unit,
wherein the mobile device includes:
a second code reception unit that receives the device code transmitted from the second code transmission unit;
a response unit that transmits the mobile device code allocated to the mobile device in response to receipt of the device code by the second code reception unit; and
a fourth registration unit that registers the device code received by the second code reception unit in the mobile device, and
wherein the control device includes a fifth registration unit that, when the mobile device code transmitted as the response from the response unit is received, registers the received mobile device code in association with the registrant identification information in the storage device of the control device.

11. The electronic key system according to claim 10, wherein:
the mobile device includes a second completion transmission unit that transmits a completion notification indicating completion of the registration to the control device when the fourth registration unit complete registering the device code; and
the control device includes a restoration unit that, in absence of receipt of the completion notification from the second completion transmission unit during elapse of a predetermined amount of time after transmission of the device code from the second code transmission unit, reverts the information about the target mobile device registered in the storage device of the control device in such a way that the information about the target mobile device to which the device code was transmitted is reverted to the information about the target mobile device which was registered before the mobile device code from the target mobile device was received.

12. An information registration system that registers information required to execute authentication processing in an electronic key system each time a registration command is inputted from outside to the electronic key system, wherein:

the electronic key system includes at least one mobile device that is carried by a user and a control device that executes authentication processing based on a result of executing information communication with the mobile device;

main identification information identifying the control device is registered in the control device as registrant identification information;

when the mobile device receives a response request including the registrant identification information and response timing, the mobile device compares the registrant identification information and the response timing which are included in the response request with registrant identification information and response timing which are registered in the mobile device, the response timing represents a timing specific to the mobile device at which the mobile device is to transmit a response including a mobile device code serving as identification information to identify the mobile device;

when a result of the comparing is a match, the mobile device transmits the mobile device code allocated to the mobile device to the control device; and the control device transmits the response request to the mobile device and executes the authentication processing by comparing a mobile device code registered in the control device with the mobile device code received from the mobile device as the identification information, the information registration system comprising a registration unit that executes registration control in which the registration unit newly generates the main identification information with different content each time a registration command is inputted from outside and registers the newly generated main identification information in a storage device of the control device in association with the mobile device code of the mobile device as the registrant identification information.

* * * * *